United States Patent

Nishiyama et al.

[11] Patent Number: 5,844,691
[45] Date of Patent: Dec. 1, 1998

[54] FACSIMILE SERVER APPARATUS, A SOUND SERVER APPARATUS, AND A FACSIMILE AND SOUND SERVER APPARATUS

[75] Inventors: Takao Nishiyama, Kamakura; Yasuki Iizuka, Tokyo; Takashi Matsuo, Kawasaki; Shigeki Yokoi, Yokohama; Takashi Mitoh, Tokyo, all of Japan

[73] Assignee: Matsushita Electric Industrial Co., Ltd., Osaka, Japan

[21] Appl. No.: 715,625

[22] Filed: Sep. 18, 1996

[30] Foreign Application Priority Data

Sep. 19, 1995 [JP] Japan .................................... 7-239443
Nov. 10, 1995 [JP] Japan .................................... 7-292380

[51] Int. Cl.⁶ ................................ H04N 1/00; H04N 1/32
[52] U.S. Cl. ............................ 358/434; 358/468; 358/500
[58] Field of Search ................................ 379/88, 100, 94, 379/102.03, 101.01; 358/400, 401, 404, 444, 443, 468, 500, 501

[56] References Cited

U.S. PATENT DOCUMENTS 4,918,722  4/1990  Duehren et al. ........................ 379/100
4,935,954  6/1990  Thompson et al. ....................... 379/89
5,193,110  3/1993  Jones et al. ............................... 379/94
5,671,269  9/1997  Egan et al. ................................. 379/88

*Primary Examiner*—David K. Moore
*Assistant Examiner*—Jerome Grant, II
*Attorney, Agent, or Firm*—Pollock, Vande Sande & Amernick

[57] ABSTRACT

In a facsimile server or a sound server, a data conversion portion and a computer interface are further provided to provide data serving by converting the data from or into the data base in the server into the data matching to the terminal under serving. A facsimile and sound server, coupled to a network, having a data base, further comprises an electronic mail analyzing portion and an electronic mail transmission and receiving portion, so that the electronic mail can be stored in or read from the data base. Moreover, a data conversion portion may be further provided to the facsimile and sound server, so that formats of various types of data may be converted to have formats matched to the types of the terminal requesting the data. Further a notice data setting portion may be further provided, so that a notice of data or a sound guidance from the facsimile and sound server can be controlled remotely by the electronic mail or a command from a telephone terminal.

4 Claims, 25 Drawing Sheets

FIG. 9

| SERVER ID | ... | NETWORK ADDRESS |
|---|---|---|
| 1 | | XXX.XXX.XXX.XXX |
| 2 | | YYY.YYY.YYY.YYY |
| ... | | ............... |
| : | | : |

# FACSIMILE SERVER APPARATUS, A SOUND SERVER APPARATUS, AND A FACSIMILE AND SOUND SERVER APPARATUS

BACKGROUND OF THE INVENTION

1. Field of the Invention

This invention relates to a facsimile server apparatus, a sound server apparatus, and a facsimile and sound server apparatus for serving facsimile data and sound data through data transmission.

2. Description of the Prior Art

A facsimile (fax) server apparatus is one image data base apparatus wherein users access from facsimile terminals through a telephone line to the facsimile server apparatus, and the user operates switches on the facsimile terminal in accordance with a sound guidance to effect a registration or reading image data using a facsimile transmission mode.

On the other hand, a sound server apparatus is one of sound data base apparatus wherein users access from telephone terminals through a telephone line to the sound server apparatus and the user operates switches on the telephone terminal in accordance with a sound guidance to effect a registration or obtaining sound data.

In the prior art facsimile server apparatus, the registration and reading image data are effected by only the facsimile terminals and in the prior art sound server apparatus, the registration and reading sound data are effected by only the telephone terminals. Moreover, the user of the facsimile server apparatus can read only image data and the user of the sound server apparatus can obtain only sound data.

SUMMARY OF THE INVENTION

The aim of the present invention is to provide an improved facsimile server apparatus, an improved sound server apparatus, and an improved facsimile and sound server apparatus for serving facsimile data and sound data through data transmission.

According to the present invention there is provided a first facsimile server apparatus comprising: a line communication portion having a plurality of ports coupled to facsimile terminals of users through a public line; a communication control portion for controlling arrivals of calls and callings, sound responses, and receiving and transmission of facsimile communication in respective plurality of ports; an image data base for controlling image data from the facsimile terminals and supplying image data to the facsimile terminals, renewing and outputting data corresponding to a request of registration and a request of data reading from other portions; a user control portion for registering the users, controlling passwords, and estimating a request of validation; a box control portion for controlling a structure of the image and text data base and rights of writing and reading by the users, and estimating validation from other portions and a personal computer interface portion for receiving a request of registration of image data in the image data base and a request of reading of image data from the image data base from a personal computer.

According to this invention there is provided a second facsimile server apparatus comprising: a line communication portion having a plurality of ports coupled to facsimile terminals of users through a public line; a communication control portion for controlling arrivals of calls and callings, sound responses, and receiving and transmission of facsimile communication in respective plurality of ports; a text data conversion portion for converting a text data to image data; an image and text data base for controlling image data and text data from the facsimile terminals and supplied to the facsimile terminals, renewing and outputting data corresponding to a request of registration and reading from other portions; a user control portion for registering the users, controlling passwords, and estimating a request of validation of the users and passwords; a box control portion for controlling a structure of the image and text data base and rights of writing and reading by the users, and estimating validation from other portions and a personal computer interface portion for receiving a request of registration of image data in the image data base and a request of reading of image data from the image data base from a personal computer, wherein the text data is transmitted to one of the facsimile apparatus through the text data conversion portion.

According to this invention, there is provided a first sound server apparatus comprising: a line communication portion having a plurality of ports coupled to telephone terminals of users through a public line; a communication control portion for controlling arrivals of calls and callings, and sound responses in respective plurality of ports; a sound data base for controlling sound data from the telephone terminals and supplied to the telephone terminals, renewing and outputting data corresponding to a request of registration and a request of data reading from other portions; a user control portion for registering the users, controlling passwords, and estimating a request of validation of the users and passwords; a box control portion for controlling a structure of the sound data base and rights of writing and reading by the users, and estimating validation from other portions; and a personal computer interface portion for receiving a request of registration of sound data in the sound data base and a request of reading of sound data from the sound data base from a personal computer.

According to this invention there is provided a third facsimile server apparatus comprising: a line communication portion having a plurality of ports coupled to the telephone terminals of users through a public line; a communication control portion for controlling arrivals of calls and callings, sound responses, and receiving and transmission of facsimile communication in respective plurality of ports; a text data conversion portion for converting a text data to sound data; a sound and text data base for controlling sound data and text data from the telephone terminals and supplied to the telephone terminals renewing and outputting data corresponding to a request of registration and a request of data reading from other portions; a user control portion for registering the users, controlling passwords, and estimating a request of validation of the user and passwords; and a personal computer interface portion for receiving a request of registration of text data in the sound and image data base and a request of reading of text data from the sound and text data base from a personal computer, wherein the text data is transmitted by one of the telephone apparatus through the text data conversion portion.

According to this invention, there is provided a first facsimile and sound server apparatus comprising: a line communication portion having a plurality of ports coupled to a telephone terminal and facsimile terminals of users through a public line; a communication control portion for controlling arrivals of calls and callings, sound responses, and receiving and transmission of facsimile communication in respective plurality of ports; a sound, image, and text data base for controlling sound data, image data, and text data from the telephone terminal, facsimile terminals and a personal computer and supplied to the telephone terminals, the facsimile terminals, and the personal computer, renewing and outputting data corresponding to a request of registration and a request of data reading from other portions; a data conversion portion for converting between text data and sound data and between the text data and image data in accordance with the kind of the terminals under servicing when data is inputted and outputted at the sound, image and text data base; a user control portion for registering the users, controlling passwords, and estimating a request of validation of the user and password; and a box control portion for controlling a structure of the sound, image and text data base and rights of writing and reading by the users, and estimating validation from other portions.

The first facsimile and sound server apparatus may further comprise a remote server access portion for communicating with another facsimile and sound server apparatus and for registering data in another facsimile and sound server and reading data from another facsimile and sound server.

In this case, an optical character reader for recognizing characters in the image data from the facsimile terminal and generating text data may be further provided. Moreover, in this case a data renewing portion may periodically acquire data which is absent in the facsimile and sound server apparatus, from another facsimile and sound server and registers the data in the facsimile and sound server apparatus.

The first facsimile and sound server apparatus may further comprise a graphic recognition portion for recognizing a figure in the image data from the facsimile terminal and for generating data, a facsimile data coloring portion for coloring every recognized figure in accordance with a predetermined color arrangement palette, and color image digitizing portion for converting color image into binary image data available for the facsimile terminals.

According to this invention there is provided a second facsimile and sound server apparatus comprising: a communication control portion for making a connection to a facsimile terminal through a telephone line, validating a user, and controlling a communication port; a user interface control portion for receiving a request from the facsimile terminal by transmitting a sound guidance to the facsimile terminal; a data base portion for storing inputted data; a data conversion portion responsive to a request from the facsimile terminal for effecting a conversion of data formats between the facsimile image data and the data stored in the data base portion; a data base control portion for controlling the structure of the data base and controlling, providing, addition, and renewing of data; and a computer interface portion for receiving a request of reading the data and receiving a registration request from the computer terminal.

The second facsimile and sound server apparatus may further comprise: an electronic mail transmission and receiving portion for transmitting and receiving an electronic mail through a network; and an electronic mail registration portion for extracting the content of the electronic mail received by the electronic mail transmission and receiving portion and converting it to have a format matching to the data stored in the data base.

In this case, a registration validation portion for validating an electronic mail as to whether or not the electronic mail is allowed to be registered when data is transmitted to be registered as an electronic mail may be further provided.

The second facsimile and sound server apparatus may further comprise: an electronic mail transmission and receiving portion connected to a network; an electronic mail transmission and receiving portion for transmitting and receiving electronic mail through a network; an electronic mail conversion portion for converting the data stored in the data base portion to have a format of the electronic mail.

In this case, an additional data setting portion for setting additional data in response to a command in the electronic mail received by the electronic mail transmission and receiving portion and an additional data storing portion for storing the additional data may be further comprised.

The second facsimile and sound server apparatus may further comprise: an outputting data control portion for changing a type of data conversion process in accordance with the type of the terminal receiving the data and changing the outputting order of the data.

The second facsimile and sound server apparatus may further comprise: an outputting control portion for controlling data supplied to the terminal side in response to a data reading request from the terminal side.

In this case, a reply registration portion responsive to sound data transmitted from a sender for aiding the receiving user to produce a reply data to the sender may be further comprised.

The second facsimile and sound server apparatus may further comprise: a data format control portion for detecting a type of data format when data is registered in the data base portion and for supplying a data type conversion request to the data conversion portion in accordance with the detected type of data format.

The second facsimile and sound server apparatus may further comprise: a moving picture data extracting portion for extracting sound data from moving picture image data and extracting a frame of the moving picture image data from the moving picture data.

According to this invention there is provided a third facsimile and sound server apparatus comprising: a format conversion portion for converting data stored in a data base to have a format matched to the type of the terminal receiving the data; a registering and reading control portion for registering an electronic mail from a personal computer and reading data in response to a request from the personal computer; and a control portion for providing an interactive operation between the terminal receiving data and the facsimile and sound sever apparatus.

BRIEF DESCRIPTION OF THE DRAWINGS

The object and features of the present invention will become more readily apparent from the following detailed description taken in conjunction with the accompanying drawings in which:

FIG. 9 is an illustration of an example of a list of remote server data of the sixth embodiment;

The same or corresponding elements or parts are designated with like references throughout the drawings.

DETAILED DESCRIPTION OF THE INVENTION (FIRST EMBODIMENT)

Figure 1:
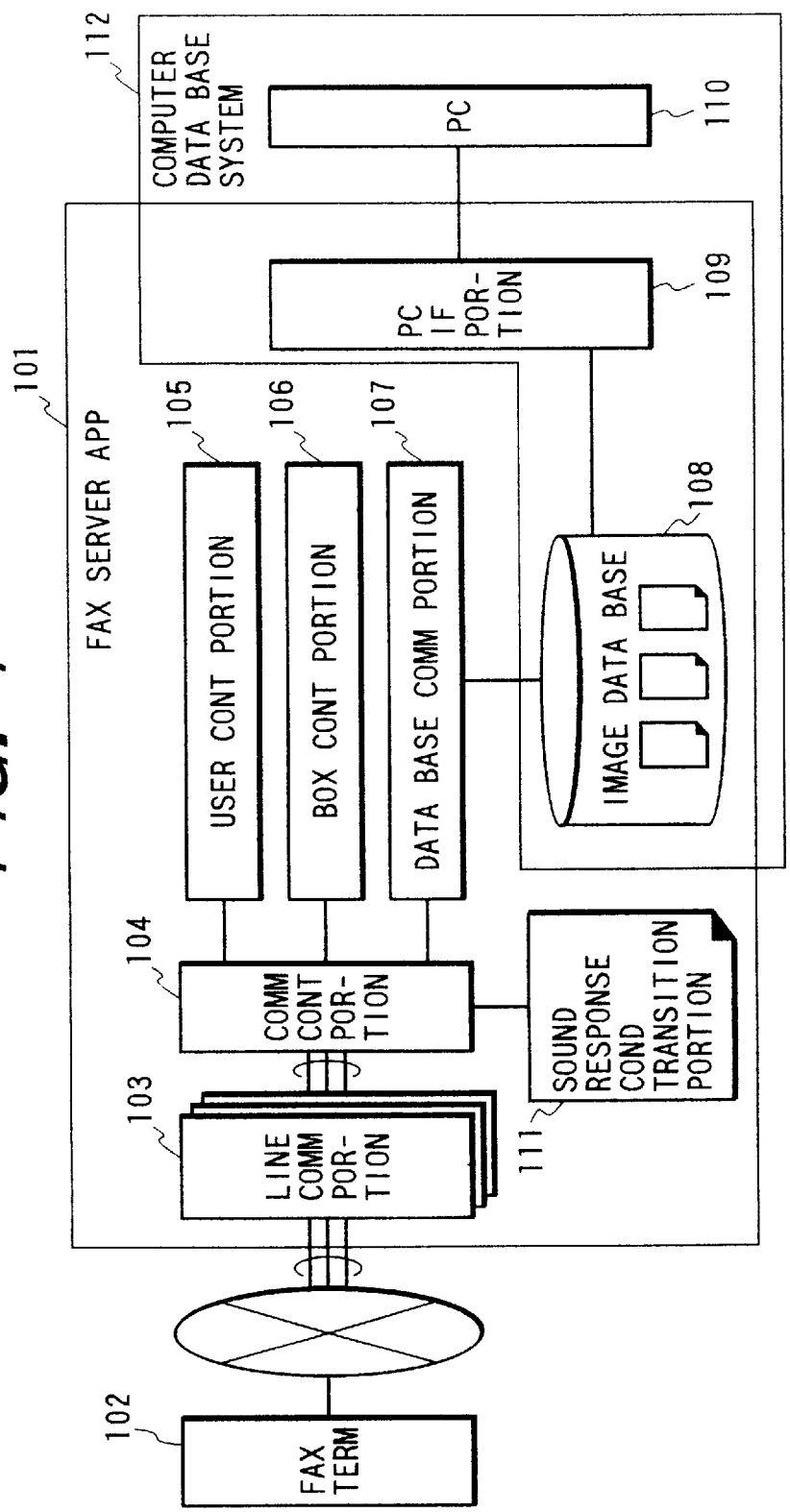
FIG. 1 is a block diagram of a facsimile server apparatus of a first embodiment.

Hereinbelow will be described a first embodiment of this invention. FIG. 1 is a block diagram of a facsimile (fax) server apparatus of the first embodiment. The fax server apparatus 101 of the first embodiment comprises a line communication portion 103 having a plurality of communication ports, a communication control portion 104, a user control portion 105, a box control portion 106, a data base communication portion 107, a personal computer (pc) interface portion 109, an image data base 108, and a sound response condition transition portion 111.

The facsimile server apparatus 101 is accessible from a plurality of facsimile (facsimile) terminals through a public network at the same time and is also accessible from a personal computer 110 through the personal computer interface portion 109.

The line communication portion 103 operates in accordance with the number of the facsimile terminals 102 coupled thereto at the same time. The line communication portion 103 digitizes an input sound signal from a facsimile terminal 102 when the line is in a sound forwarding mode, the line communication portion 103 sends it to the communication control portion 104, and transmits a return value through a sound to the facsimile terminal 102. When the line is in a facsimile forwarding mode, the line communication portion 103 files data from the facsimile terminal 102 when the line communication portion 103 is on a receiving side and after completion of filing, the line communication portion 103 commands the communication control portion 104 to execute a processing. When the line is in a facsimile mode and the line communication portion 103 is on the transmission side, the line communication portion 103 transmits the image data indicated by the communication control portion 104 to the facsimile terminal 102 under communication.

In the user control portion 105, users of the facsimile server apparatus 101 and pass-words are registered and the user control portion 105 validates users.

The box control portion 106 stores data indicating which user are accessible to each data stored in the image data base 108, and stores a list of data of keywords for accessing to each data and data of a train of numbers corresponding to the keywords. The image data base 108 effects a validation of a right of access by a user and a control of the presence or absence of the data, and converts the trains of number inputted from a facsimile terminal 102 into the keyword for accessing to the image data base 108.

The data base communication portion 107 has a function of reading and registering of data from or to the image data base 108 with a specified keyword and provides this function to the communication control portion 104.

The personal computer 110, the personal computer interface portion 109, the image data base 108 form a conventional computer data base system 112.

Figure 2:
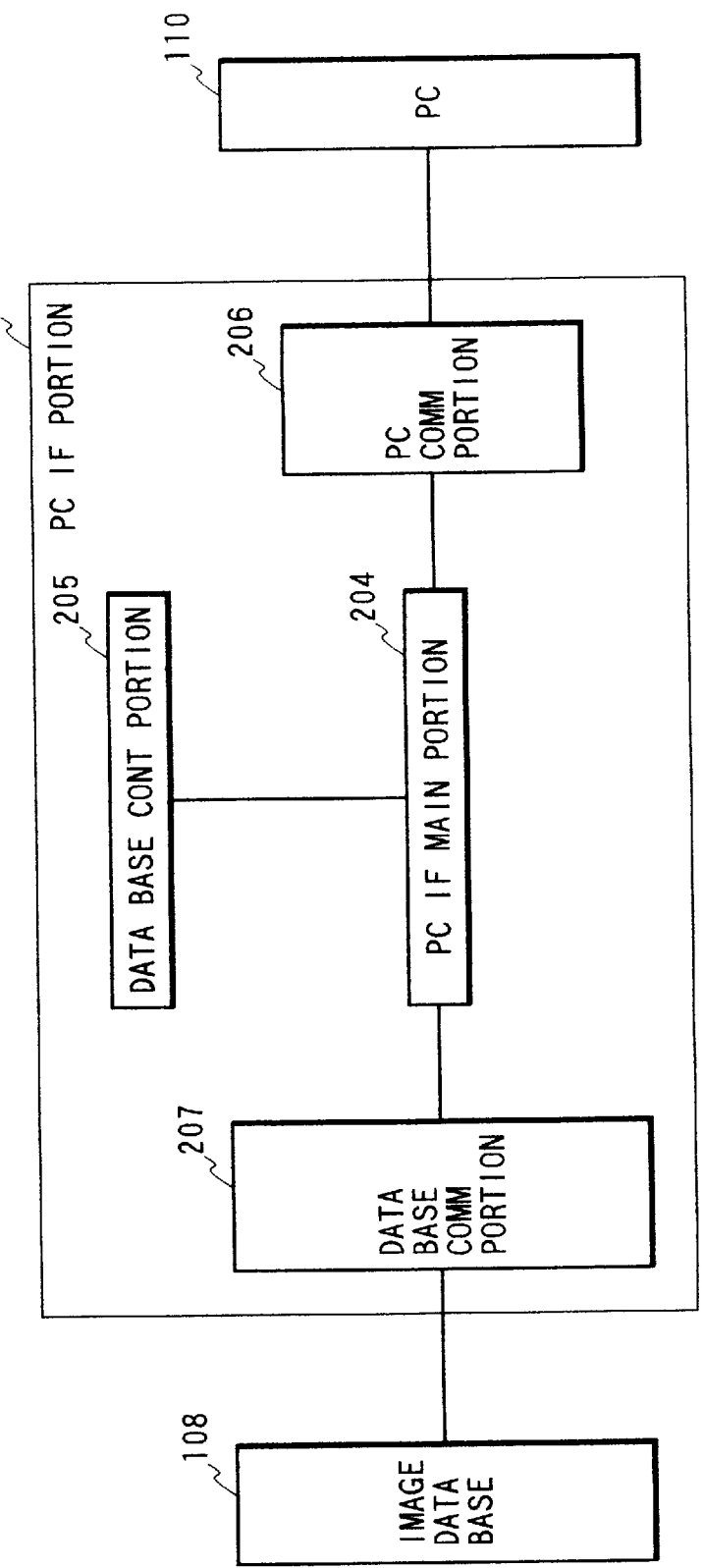
FIG. 2 is a block diagram of a computer data base system shown in FIG. 1.

FIG. 2 is a block diagram of the computer data base system 112 shown in FIG. 1. The personal computer interface portion 109 accesses to the image data base 108 using a data base communication portion 207, and receives an access from the personal computer 110 using a personal computer communication portion 206. A personal computer interface main portion 204 receives a request from the personal computer 110 through the personal computer communication portion 206 and accesses to the image data base 108 through the data base communication portion 207 in accordance with the data base access keyword under requesting and the kind of the request, i.e., a registration or a search. In this operation, the keyword indicated by the personal computer 110 is estimated by the data base control portion 205 to validate the right of access.

In FIG. 1, the communication control portion 104 controls a condition transition of the plurality of ports in the line communication portion 103 with reference to the sound response condition transition portion 111 in corporation with the box control portion 106 and the user control portion 105.

The communication control portion 104 sends a request and a value from a line communication portion 103 to the sound response transition portion 111, starts an action stored in the sound response condition transition portion 111, changes the condition, and returns a return value to the line communication portion 103.

When the action stored in the sound response condition transition portion 111 is the validation of the user, the communication control portion 104 transfers the input value from the line communication portion 103 to the user control portion 105 and in accordance with the return value from the user control portion 105, the communication control portion 104 changes its condition, and returns a return value to be outputted by the line communication portion 103 as sound.

When the action stored in the sound response condition transition portion 111 is a box validation, the communication control portion 104 sends the input value from the line communication portion 103 to the box control portion 106, changes the condition in accordance with the return value from the box control portion 106, and returns a return value to be outputted by the line communication portion 103 as sound.

When the action stored in the sound response condition transition portion 111 is a reading data, the communication control portion 104 converts the input value into a keyword for access to the image data base using the box control portion 106, sends it to the data base 108 through the data base communication portion 107, acquires a pointer as a return value from the data base 108. In response to this, the server communication control portion 104 changes the condition, and returns the pointer as a return value to be outputted by the line communication portion 103 as sound.

When the action stored in the sound response condition transition portion 111 is the data registration, the communication control portion 104 converts the input value into the keyword for access to the image data base 108 using the box control portion 106, sends it to the data base 108 through the data base communication portion 107, registers the inputted image data from the line communication portion 103 in the image data base 108, and changes the condition.

In the facsimile server apparatus 101 having the structure mentioned above, the reading and registration of image from the facsimile terminals 102 and the personal computer 110 can be provided, so that the kinds of terminals accessible to the facsimile terminal apparatus 101 is increased. Therefore, the number of users is expected to increase.

In this embodiment, interfacing is provided to the data base communication portion 107 and the image data base 108 which form the computer data base system 112 by modifying the communication control portion 104. However, interfacing can be also provided to the computer data base system 112 by modifying the personal computer interface portion 109.

The input sound from the facsimile terminal 102 which is received and digitized by the line communication portion 103 is generated by utilizing sounds generally generated by depressing numerical push buttons or sounds generated by dial pulses.

(SECOND EMBODIMENT)

Figure 3:
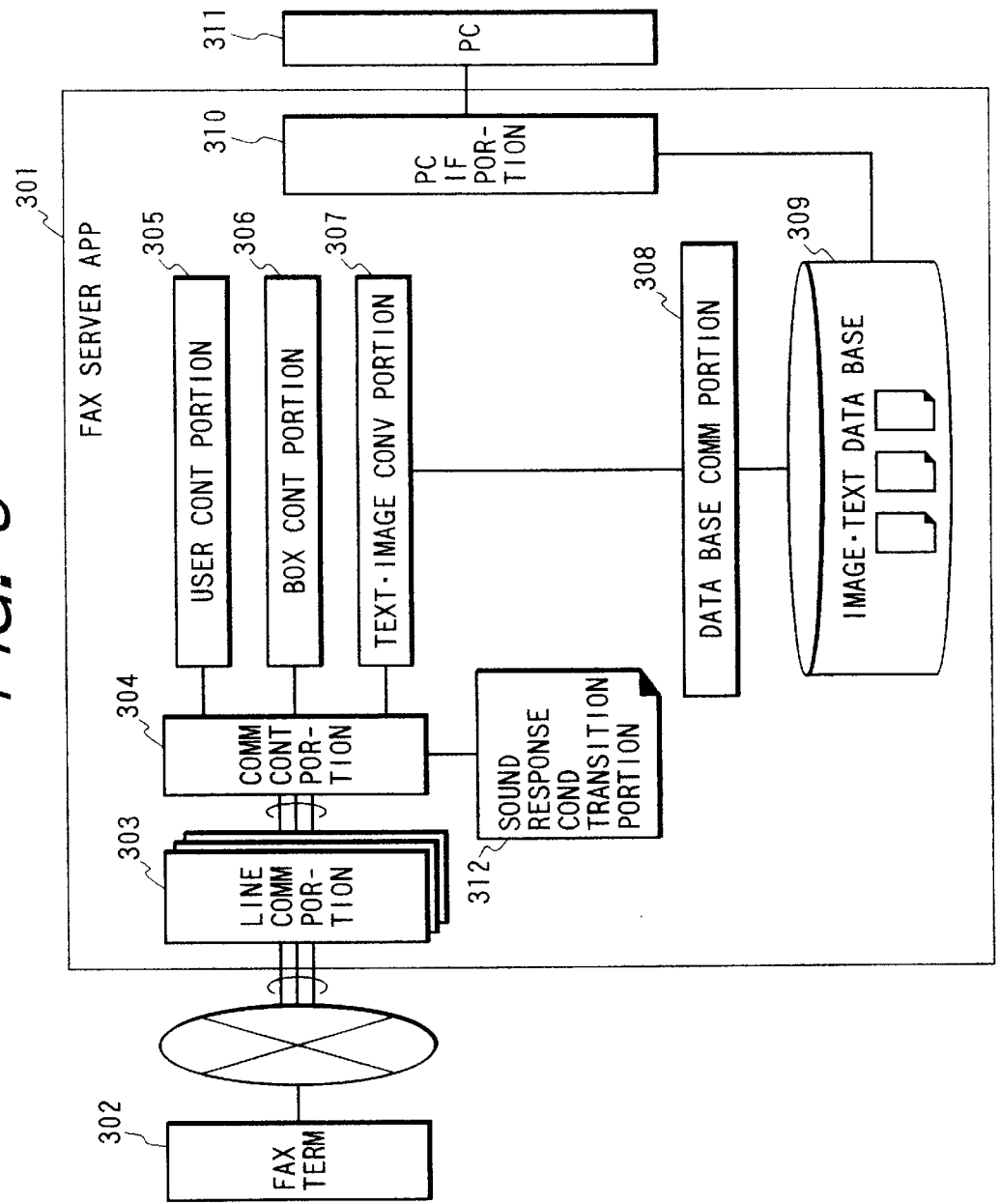
FIG. 3 is a block diagram of a facsimile server apparatus of a second embodiment.

Hereinbelow will be described a second embodiment of this invention. FIG. 3 is a block diagram of a facsimile server apparatus 301 of the second embodiment. The facsimile server apparatus 301 of the second embodiment comprises a line communication portion 303 having a plurality of communication ports, a communication control portion 304, a user control portion 305, a box control portion 306, a text and image data conversion portion 307, a data base communication portion 308, a personal computer (pc) interface portion 310, an image and text data base 309, and a sound response condition transition portion 112.

In FIG. 3, the structure and operation of the second embodiment is similar to those of the first embodiment except the text and image data conversion portion 307, the image and text data base 309, and the personal computer interface portion 310.

The image and text data are stored and controlled in the image and text data base 309. The personal computer interface portion 310 transmits image data and text data between the personal computer 311 and the image and text data base 309.

If the data read from the image and text data base 309 is text data in response to the request from the facsimile terminal 302, the text and image conversion portion 307 converts text data into image data to make all data transmitted to the communication control portion 304 image data.

In the facsimile server apparatus 301 having the structure mentioned above, reading and registration of image data from the facsimile terminal 302 and the personal computer 311 are provided and reading and registration of text data from the personal computer 311 can be provided. Moreover, the facsimile terminal 302 can read the text data registered by the personal computer 311 as image data, so that the kinds of data handled are increased.

(THIRD EMBODIMENT)

Figure 4:
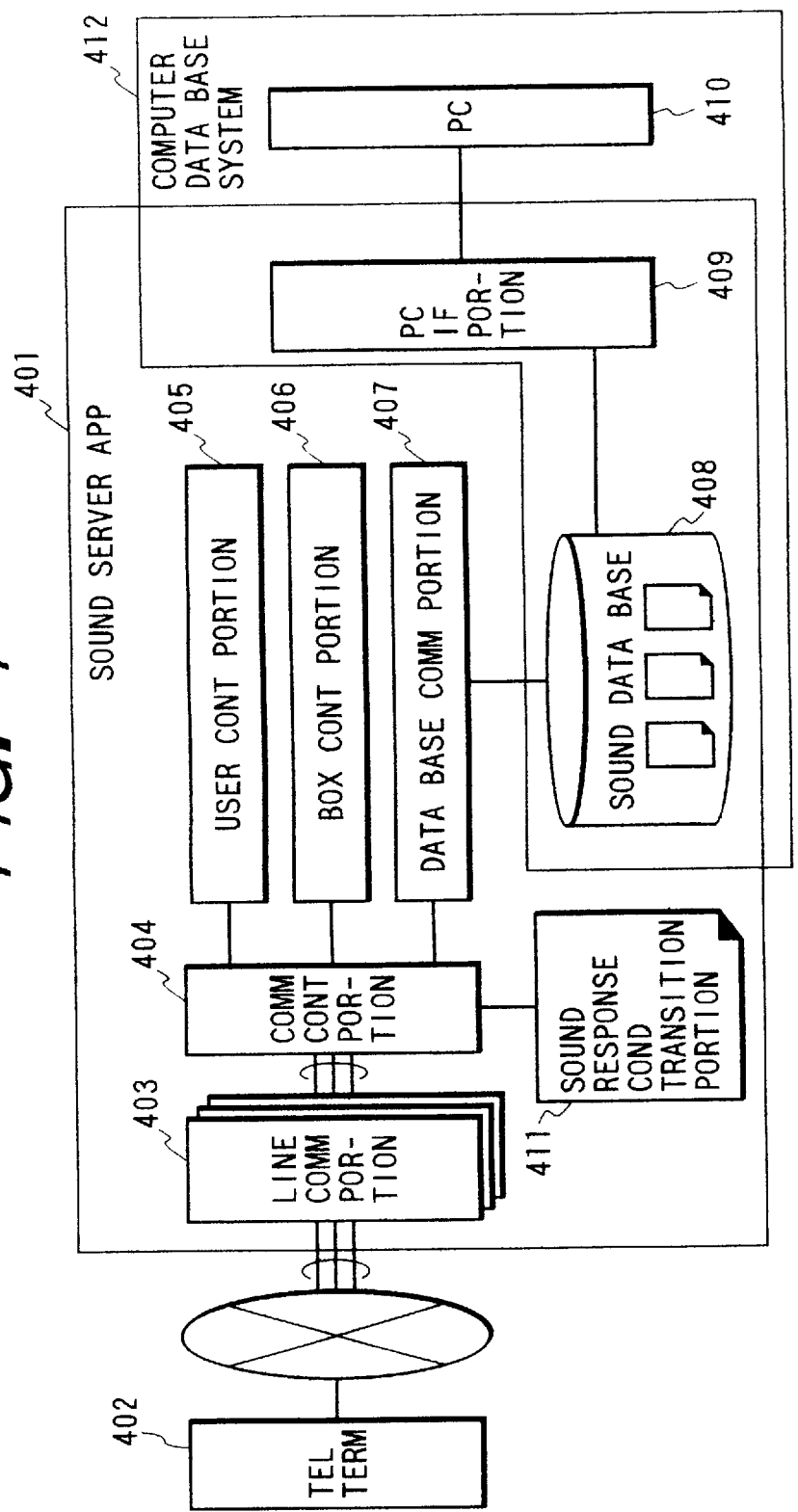
FIG. 4 is a block diagram of a sound server apparatus of a third embodiment.

Hereinbelow will be described a third embodiment of this invention. FIG. 4 is a block diagram of a sound server apparatus 401 of the third embodiment. The sound server apparatus 401 of the third embodiment comprises a line communication portion 403 having a plurality of communication ports, a communication control portion 404, a user control portion 405, a box control portion 406, a data base communication portion 407, a personal computer interface portion 409, a sound data base 408, and a sound response condition transition portion 411.

The sound server apparatus 401 is accessible from a plurality of telephone terminals 402 through a public network at the same time and is also accessible from a personal computer 410 through a personal computer interface portion 409.

The line communication portion 403 operates in accordance with the number of the telephone terminals 402 coupled thereto at the same time. The line communication portion 403 digitizes an input sound signal from a telephone terminal 402 during an operation by the user, sends it to the communication control portion 404, and transmits a return value as a sound to the telephone terminal 402. When sound data is registered, the line communication portion 403 effects filing the input sound from the telephone terminal 402 and sends a registration request to the communication control portion 404. When sound data is read, the line communication portion 403 supplies the sound data obtained by the return value from the communication control portion 404 to the telephone terminal 402.

In the user control portion 405, users of the sound server apparatus 401 are registered and passwords are stored and the user control portion 105 validates users.

The box control portion 406 stores data indicating which users may access each data stored in the sound data base 408, and stores a list of data of keywords for accessing each data and data of a train of numbers corresponding to the keywords. The sound data base 408 effects a validation of a right of access by a user and a control of the presence or absence of the data, and converts the trains of number inputted from a telephone terminal 402 into a keyword for accessing the image data base 408.

The data base communication portion 407 has a function of reading and registration of data from or to the sound data base 408 with a specified keyword and provides this function to the communication control portion 404.

The personal computer 410, the personal computer interface portion 409, the sound data base 408 form a conventional computer data base system 412.

The personal computer interface portion 409 has the same structure as the personal computer interface portion 201 shown in FIG. 2.

The communication control portion 404 controls condition transitions of the plurality of line communication portions 403 with reference to the sound response condition transition portion 411 in corporation with the box control portion 406 and the user control portion 405.

The communication control portion 404 sends a requests and a value from the line communication portion 403 to the sound response transition portion 411, starts an action stored in the sound response condition transition portion 411, changes the condition, and returns a return value to the line communication portion 403.

When the action stored in the sound response condition transition portion 411 is the validation of the user, the communication control portion 404 transfers the input value from the line communication portion 403 to the user control portion 405 and in accordance with the return value from the user control portion 405, changes its condition, and returns a return value to be outputted by the line communication portion 403 as sound.

When the action stored in the sound response condition transition portion 411 is a box validation, the communication control portion 404 sends the input value from the line communication portion 403 to the box control portion 406, changes the condition in accordance with the return value from the box control portion 406, and returns a return value to be outputted by the line communication portion 403 as sound.

When the action stored in the sound response condition transition portion 411 is the data reading, the communication control portion 404 converts the input value into a keyword for access to the sound data base 408 using the box control portion 406, sends it to the sound data base 408 through the data base communication portion 407, acquires a pointer as a return value from the data base 408, and in response to this, changes the condition, and returns the pointer as a return value to be outputted by the line communication portion 403 as sound.

When the action stored in the sound response condition transition portion 411 is the data registration, the communication control portion 404 converts the input value into the keyword for access to the sound data base 408 using the box control portion 406, sends it to the sound data base 408 through the data base communication portion 407, registers the inputted sound data from the line communication portion 403 in the sound data base 108, and changes the condition.

In the sound server apparatus 401 having the structure mentioned above, the reading and registration of image data from the telephone terminals 402 and the personal computer 410 can be provided, so that the kinds of terminals accessible to the telephone terminal apparatus 401 is increased. Therefore, the number of users is expected to increase.

In this embodiment, interfacing is provided to the data base communication portion 407 and the sound data base 408 which form a data base system by modifying the communication control portion 404. However, interfacing can also be provided to the data base system by modifying the personal computer interface portion 409.

The input sound from the telephone terminal 402 which is received and digitized by the line communication portion 403 is generated by utilizing sounds generally generated by depressing numerical push buttons on the terminal or sounds generated by dialing pulses.

(FOURTH EMBODIMENT)

Figure 5:
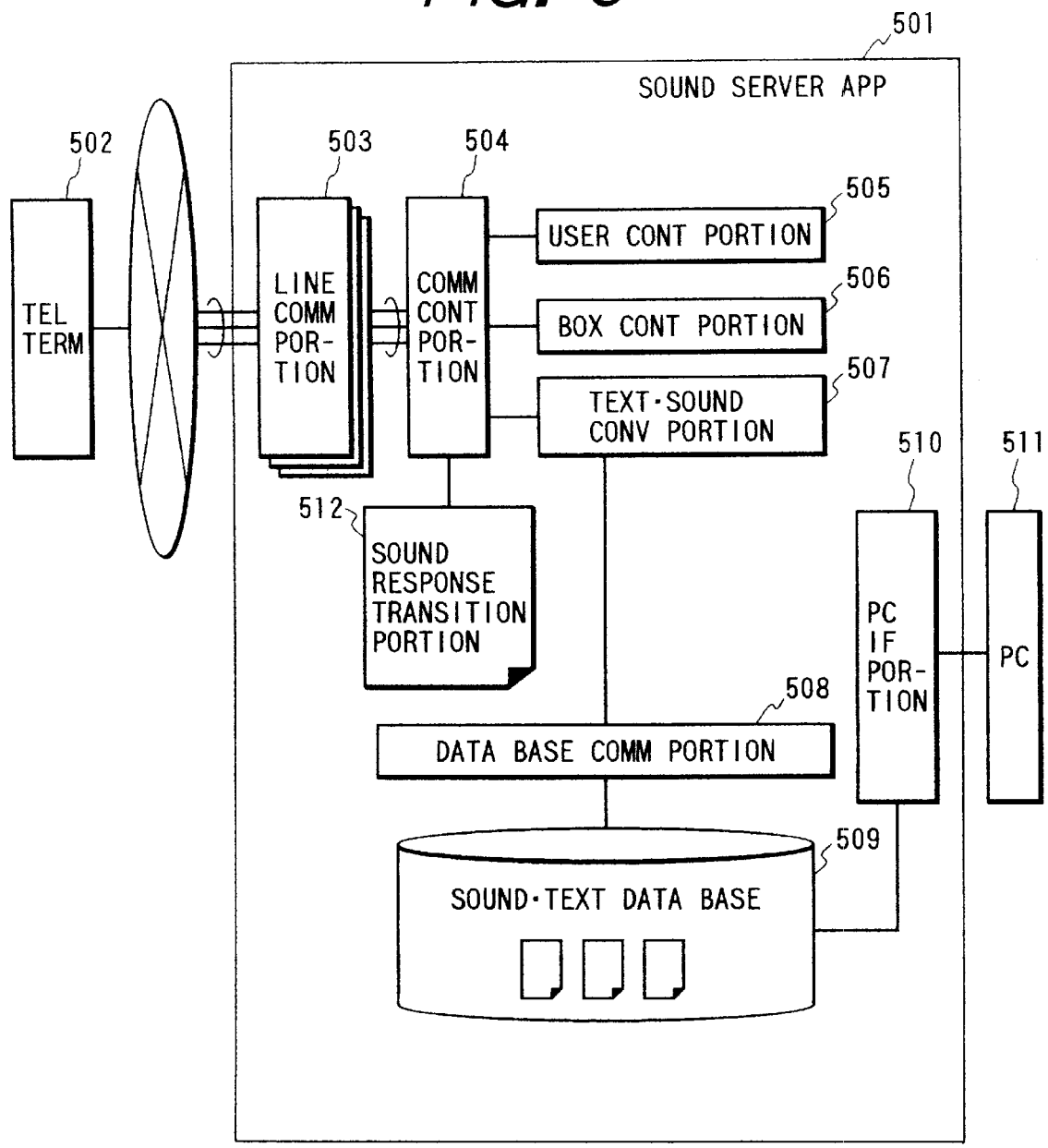
FIG. 5 is a block diagram of a sound server apparatus of a fourth embodiment.

Hereinbelow will be described a fourth embodiment of this invention. FIG. 5 is a block diagram of a sound server apparatus of the fourth embodiment. The sound server apparatus 501 of the fourth embodiment comprises a line communication portion 503 having a plurality of communication ports, a communication control portion 504, a user control portion 505, a box control portion 506, a text and sound data conversion portion 507, a data base communication portion 508, a personal computer interface portion 510, a sound and text data base 509, and a sound response condition transition portion 512.

In FIG. 5, the structure and operation of the fourth embodiment is the same as those of the third embodiment except the text and sound data conversion portion 507, the sound and text data base 509, and the personal computer interface portion 510.

The sound and text data are stored and controlled in the sound and text data base 509. The personal computer interface portion 510 transmits sound data and text data between the personal computer 511 and the sound and text data base 509 through procedures selected in accordance with the kind of the target data to be operated.

If the data read from the sound and text data base 509 is text data when data read from the telephone terminal 502, the text and sound conversion portion 507 converts the text data into sound data to make all data transmitted to the communication control portion 504 sound data.

In the sound server apparatus 501 having the structure mentioned above, reading and registration of sound data from the telephone terminal 502 and the personal computer 511 are provided and reading and registration of text data from the personal computer 511 can be provided. Moreover, the telephone terminal 502 can read the text data registered by the personal computer 511 as the sound data, so that the kinds of data handled are increased.

(FIFTH EMBODIMENT)

Figure 6:
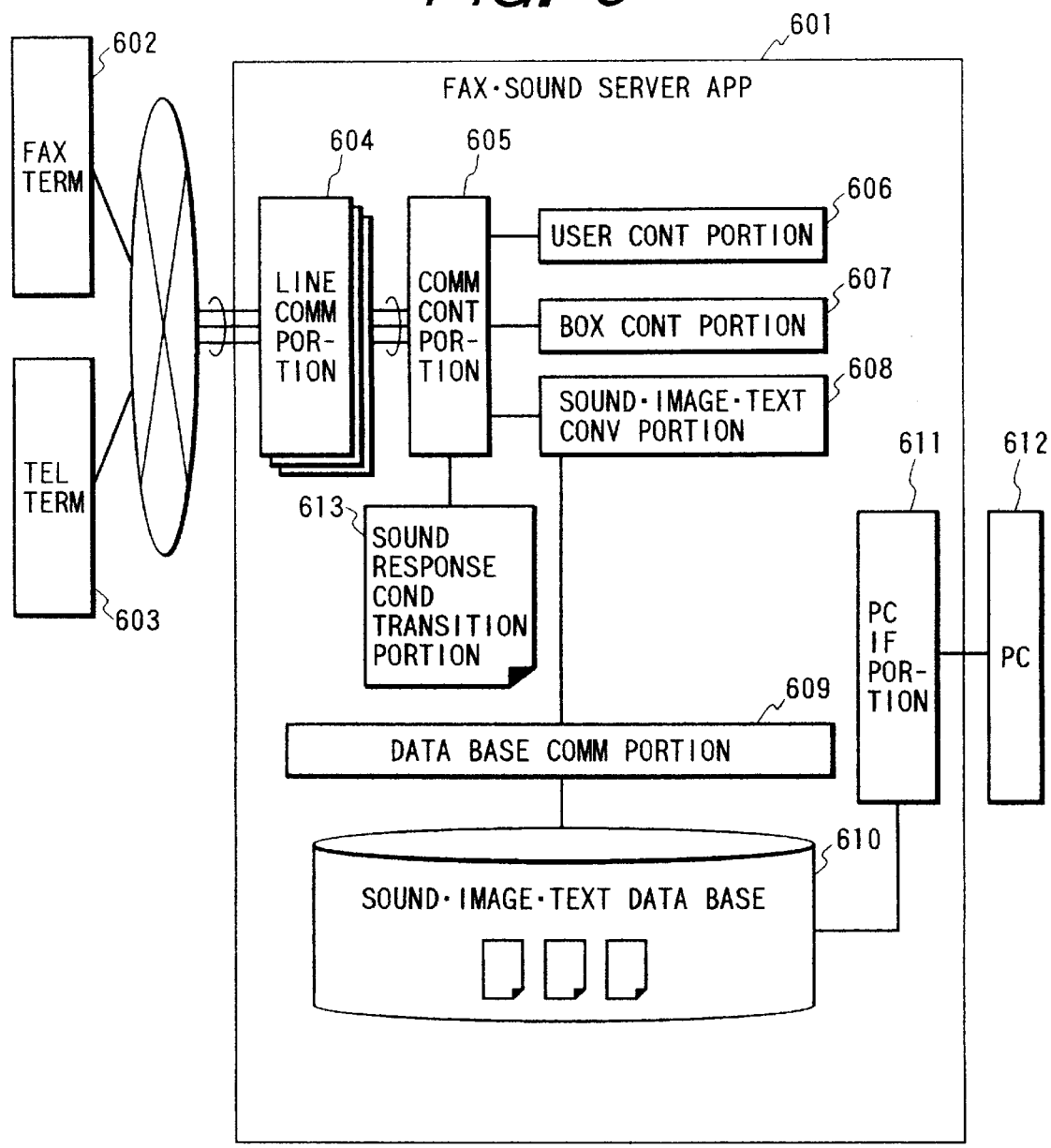
FIG. 6 is a block diagram of a facsimile and sound server apparatus of a fifth embodiment.

Hereinbelow will be described a fifth embodiment of this invention. FIG. 6 is a block diagram of a facsimile and sound server apparatus 601 of the fifth embodiment. The facsimile and sound server apparatus 601 of the fifth embodiment comprises a line communication portion 604 having a plurality of communication ports, a communication control portion 605, a user control portion 606, a box control portion 607, a sound, image and text conversion portion 608, a data base communication portion 609, a sound, image, and text data base 610, a personal computer interface portion 611, and a sound response condition transition portion 613.

The facsimile and sound server apparatus 601 is accessible from a plurality of facsimile terminals 602 and telephone terminals 603 through a public network at the same time and is also accessible from a personal computer 612 through the personal computer interface portion 611.

The line communication portion 604 operates in accordance with the number of the facsimile terminals 602 and the telephone terminals 603 coupled thereto at the same time. When the coupled terminal is one of facsimile terminals and it is in a sound transfer mode, the coupled line communication portions 604 digitizes an input sound signal from a facsimile terminal 602, sends it to the communication control portion 605, and transmits a return value as a sound to the facsimile terminal 602.

When the line is in a facsimile forwarding mode and the line communication portion 604 is on the receiving side, the line communication portion 604 effects filing of data from the facsimile terminal 602 and after completion of filing, the line communication portion 604 commands the communication control portion 605 to execute processing.

When the line is in a facsimile mode and the line communication portion 604 is on the transmission side, the line communication portion 604 transmits the image data indicated by the communication control portion 605 to the facsimile terminal 602 under communication.

If the terminal is a telephone terminal 603, the line communication portion 604 digitizes an input sound signal from a telephone terminal 603 during an operation by the user, sends it to the communication control portion 605, and transmits a return value as a sound to the telephone terminal 603. When sound data is registered, the line communication portion 604 effects filing to input sound from the telephone terminal 603 and sends a registration request to the communication control portion 605. When sound data is read, the line communication portion 604 supplies the sound data obtained by the return value from the communication control portion 605 to the telephone terminal 602.

In the user control portion 606, users of the facsimile and sound server apparatus 601 are registered and passwords are stored and the user control portion 105 validates users.

The box control portion 607 stores data indicating which users are accessible to each data stored in the sound, image, and text data base 601, and stores a list of data of keywords for access to each data and data of a train of numbers corresponding to the keywords. The sound, image, and text data base 610 effects a validation of a right of access by a user and a control of the presence or absence of the data, and converts the trains of number inputted from a facsimile terminal 602 and a telephone terminal 603 into a keyword for accessing to the sound, image, and text data base 610.

The sound, image, and text data base 601 stores sound data, image data, and text data.

The data base communication portion 609 has a function of reading and registration of data from or to the sound, image, and text data base 610 with a specified keyword and provides this function to the communication control portion 608.

The personal computer interface portion 611 has the same structure as the personal computer interface portion 201 shown in FIG. 2.

The communication control portion 605 controls condition transitions of the line communication portion 604 with reference to the sound response condition transition portion 613 in cooperation with the box control portion 607 and the user control portion 606.

The communication control portion 605 sends a request and a value from the line communication portion 604 to the sound response transition portion 613, starts an action stored in the sound response condition transition portion 613, changes the condition, and returns a return value to the line communication portion 604.

When the action stored in the sound response condition transition portion 613 is the user validation of the user, the communication control portion 605 transfers the input value from the line communication portion 604 to the user control portion 606 and in accordance with the return value from the user control portion 606, changes its condition, and returns a return value to be outputted by the line communication portion 604 as sound.

When the action stored in the sound response condition transition portion 613 is a box validation, the communication control portion 605 sends the input value from the line communication portion 604 to the box control portion 607, changes the condition in accordance with the return value from the box control portion 607, and returns a return value to be outputted by the line communication portion 604 as sound.

When the action stored in the sound response condition transition portion 613 is a reading data, the communication control portion 605 converts the input value into a keyword for access to the sound, image, and text data base 610 using the box control portion 607, sends it to the sound, image, and text data base 610 through the data base communication portion 609, acquires a pointer as a return value from the data base 610, in response to this, changes the condition, and returns the pointer as a return value to be outputted by the line communication portion 604 as sound.

When the action stored in the sound response condition transition portion 613 is the data registration, the communication control portion 605 converts the input value into the keyword for access to the sound, image and text data base 610 using the box control portion 607, sends it to the sound, image, and text data base 610 through the data base communication portion 609, registers the inputted sound data from the line communication portion 604 in the sound, image, and text data base 610, and changes the condition.

If the data read from the sound, image, and text data base 610 is text data when data is read from the facsimile terminal 602 and the telephone terminal 603, the sound, image, and text conversion portion 608 converts the text data into another data matching to the kind of the terminal.

In the sound server apparatus 601 having the structure mentioned above, the facsimile terminal 601 can read out the text data and can read and registers image data. The telephone terminal 603 can read the text data and can read and register sound data. The personal computer 612 can read and register all kinds of data. Therefore, the kinds of data which can be registered and read out and the number of terminals accessible to the facsimile, sound server apparatus 601 is increased. Then, the network is expected to spread.

(SIXTH EMBODIMENT)

Figure 7:
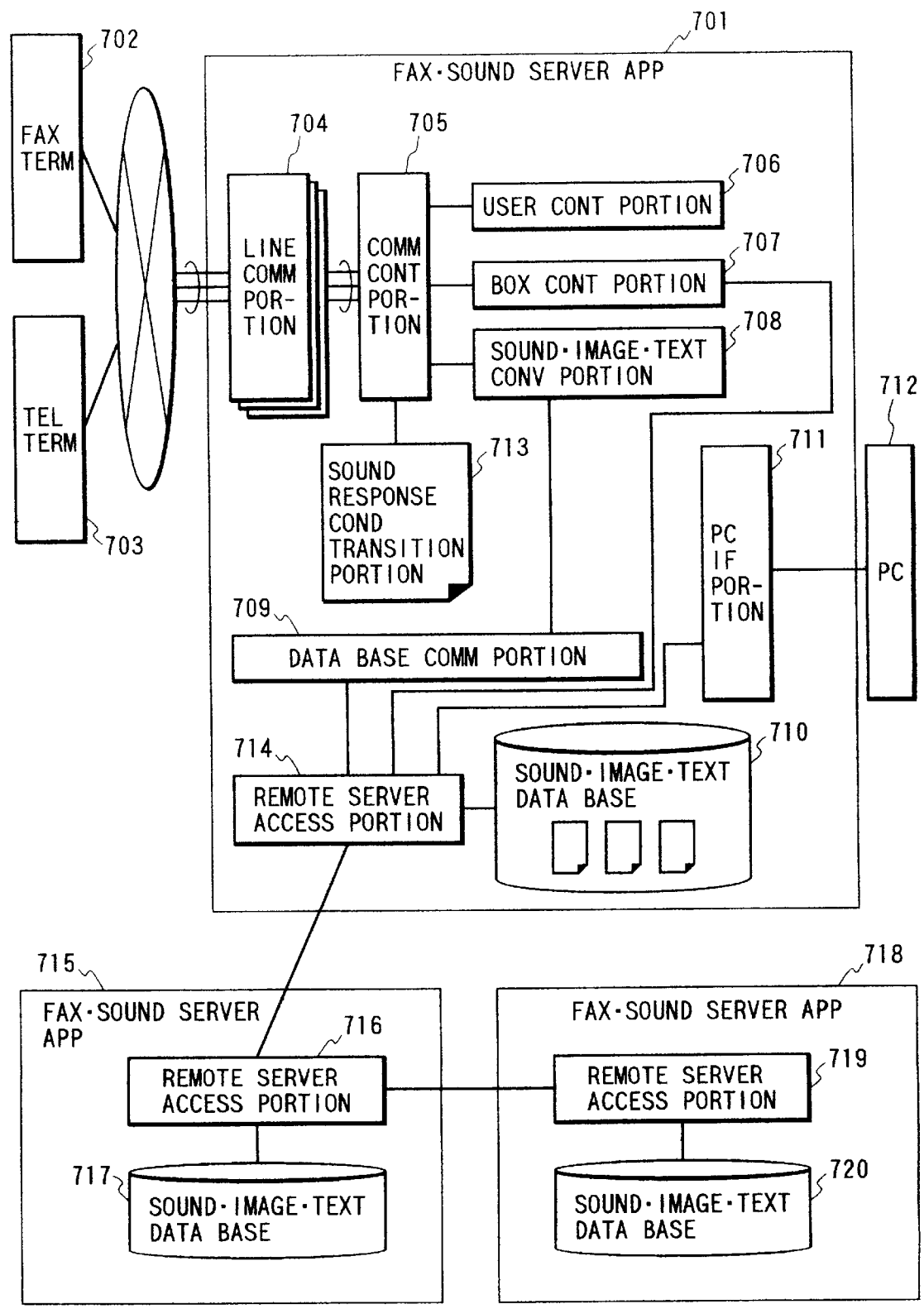
FIG. 7 is a block diagram of a facsimile and sound server apparatus of a sixth embodiment.

Hereinbelow will be described a sixth embodiment of this invention. FIG. 7 is a block diagram of a facsimile and sound server apparatus 701 of the sixth embodiment. The facsimile and sound server apparatus 701 of the sixth embodiment comprises a line communication portion 704 having a plurality of communication ports, a communication control portion 705, a user control portion 706, a box control portion 707, a sound, image and text conversion portion 708, a data base communication portion 709, a sound, image, and text data base 710, a personal computer interface portion 711, a sound response condition transition portion 713, and a remote server access portion 714.

The basic structure and operation of the sixth embodiment are similar to those of the fifth embodiment. The difference is in that the remote server access portion 714 is further provided and the data base communication portion 709 and the personal computer interface portion 711 communicate with the sound, image, text data base 710 through the remote server access portion 714. The data base communication portion 709 and the personal computer interface portion 711 require the remote server access portion 714 to access actual data in response to data reading/registration access from the sound, image, and text conversion portion 708.

The remote server access portion 714 judges whether the data indicated by a data access request directs to this facsimile and sound server apparatus 701 or in another facsimile and sound server apparatus. When the data indicated by the data access request directs this facsimile and sound server apparatus 701, the remote server access portion 714 effects a process to the sound, image, and text data base 710. When the data indicated by the data access request directs to another facsimile and sound server apparatus, the remote server access portion 714 communicates with a remote server access portion of the target facsimile and sound server apparatus to obtain the data.

Figure 8:
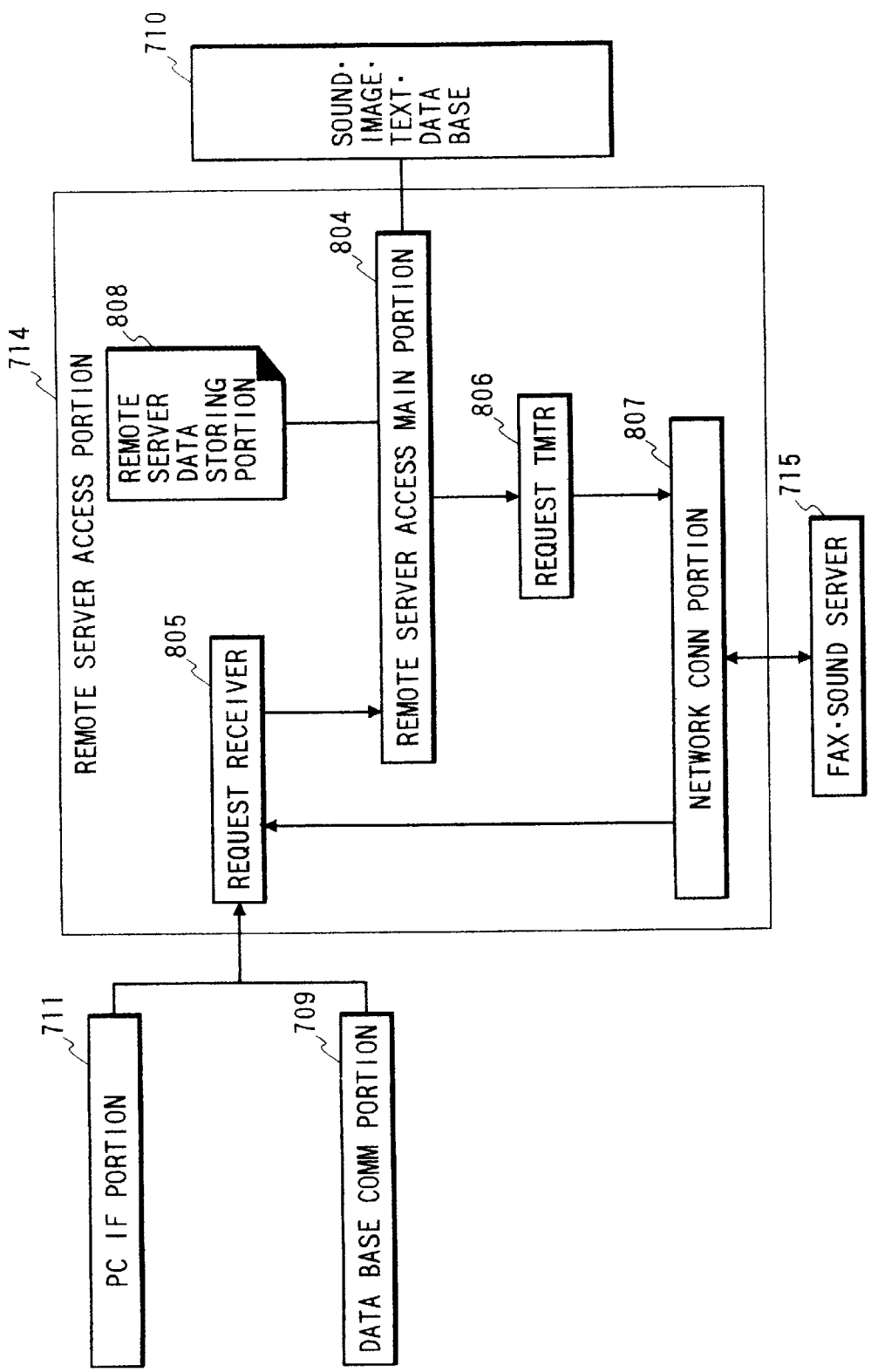
FIG. 8 is a block diagram of a remote server access portion of the sixth embodiment shown in FIG. 7.

FIG. 8 is a block diagram of the remote server access portion of the sixth embodiment. The remote server access portion 714 comprises a remote server access main portion 804, a request receiver 805, a request transmitter 806, a network connection portion 807, and a remote server data 808.

The request receiver 805 receives a data base access request from the personal computer interface portion 711, the data base communication portion 709, or another facsimile and sound server apparatus through the network connection portion 807 and sends it to the remote server access main portion 804 and returns the result from the remote server access main portion 804 to the source of the data base access request.

The remote server access main portion 804 detects which server stores the data indicated by the data base access request with reference to the remote server data storing portion 808. When the data is in this facsimile and sound server apparatus 701, the remote server access main portion 804 accesses the data in the sound, image, and text data base 809 and returns the result to the request receiver 805. When the data base access request is judged as that directing another facsimile and sound server apparatus, the remote server access main portion 804 transmits a request to the target facsimile and sound server apparatus through the request transmitter 806 and the network connection portion 807.

FIG. 9 is an illustration of an example of a list of remote server data of the sixth embodiment. Each of remote server data has a server identification (ID) uniquely defined and a network address. The remote server data storing portion 808 stores data of this facsimile and server apparatus 701 in addition to the data of another accessible servers through the network.

Figure 10:
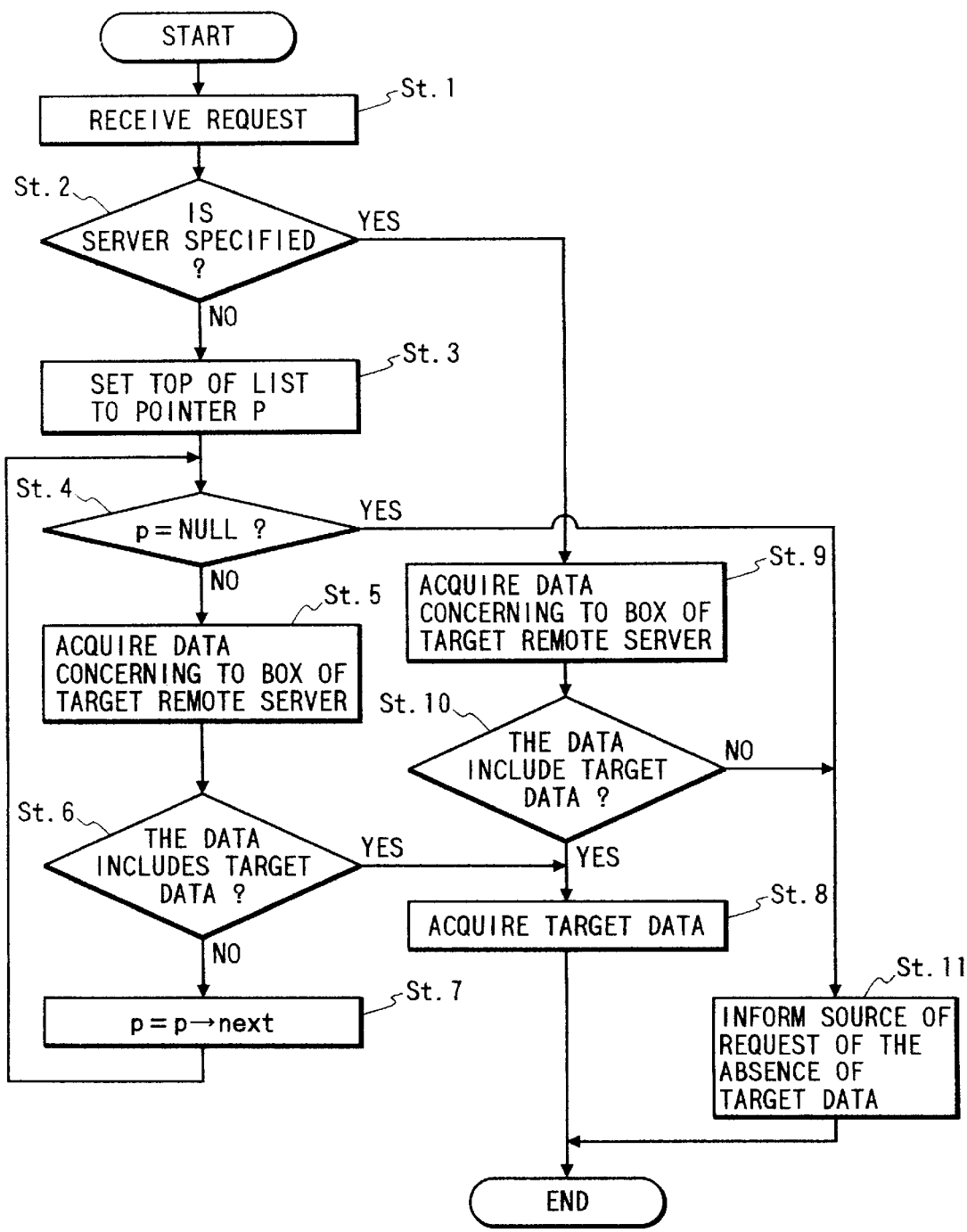
FIGS. 10 and 11 are diagrams of flow charts of remote server access portion of the sixth embodiment.
Figure 11:
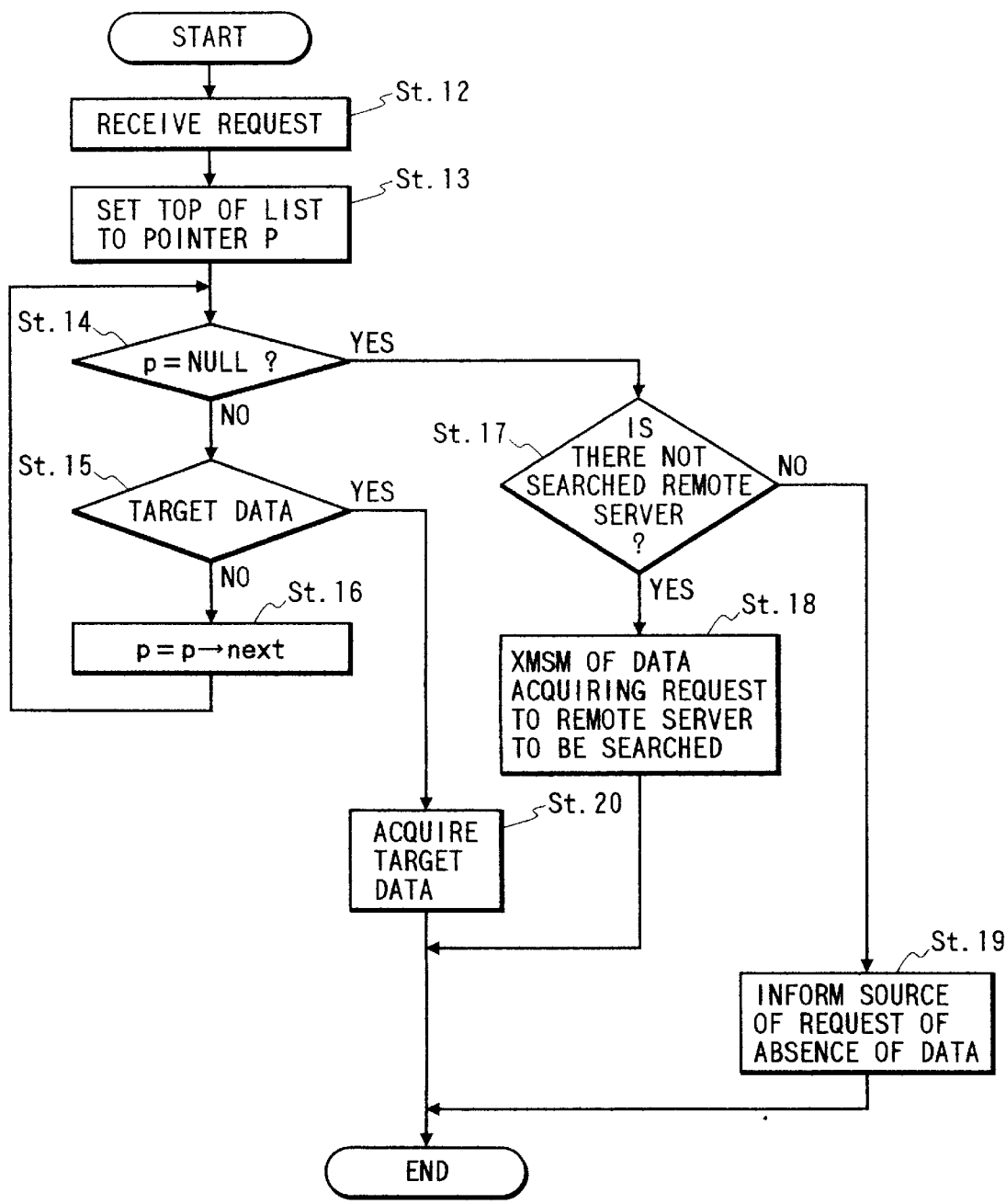

An operation of the remote server access portion 714 having the structure mentioned above will be described. FIGS. 10 and 11 are diagrams of flow charts of remote server access portion 714 of the sixth embodiment, wherein either of flow charts in FIGS. 10 and 11 can provide the operation of the remote server access portion 714.

At first, the operation using the flow chart in FIG. 10 will be described.

In step st1, the request receiver 805 receives the data base access request.

In step st2, the remote server access main portion 804 analyzes an argument included in the data base access request and judges whether or not the server is specified by the argument.

In step st3, if the server is specified by the argument, the remote server access portion 714 sets a top of the list of the remote server data to a pointer p.

In step st4, the remote server access portion 714 makes a decision as to whether or not a value in the pointer is NULL.

If the value in the pointer p is not NULL, the remote server access portion 714 acquires a keyword for the target data base or data concerning the box and a list of a train of numbers from a box control portion of the target remote server indicted by the pointer p in step st5.

In step st6, the remote server access portion 714 makes a decision as to whether or not the target data is in the acquired list of trains of numbers.

If the target data is not in the acquired list of trains of numbers, the remote server access portion 714 increases the pointer p by one in step st7 and processing returns to step st4.

If the target data is included in the acquired list of trains of numbers in step st6, the remote server access portion 714 acquires the target data through the request transmitter 806 and the network connection portion 807 from the target server using the acquired keyword and sends the target data to the source of the request in step st8.

If the server is specified by the argument in step st2, the remote server access portion 714 acquires the network address of the target server from the remote server data storing portion 808 and acquires a keyword for the target data base and a list of a train of numbers from a box control portion of the target remote server instep st9.

In step st10, the remote server access portion 714 makes a decision as to whether or not the target data is in the acquired list of trains of numbers.

If the target data is in the acquired list of trains of numbers, processing proceeds to step st8.

If the value in the pointer p is NULL in step st4 or if the target data is not in the acquired list of trains of numbers in step st10, the remote server access portion 714 informs the source of the request of the absence of the target data in any of servers in step st11.

As mentioned, the target data in the remote server and in this server can be obtained.

Another operation of the remote server access portion 714 will be described with reference to FIG. 11.

In step st12, the request receiver 805 receives the data base access request.

In step st13, the remote server access portion 714 acquires a list of the train of numbers and keyword of this remote server from the box control portion and the remote server access portion 714 sets a top of the list of this remote server data to the pointer p.

In step 14, the remote server access portion 714 makes a decision as to whether or not a value in the pointer is NULL.

If the value in the pointer is not NULL and if the train of numbers in the list does not agree with the train of numbers specified by the source of the request in step st15, the pointer p is increased by one in step st16 and processing returns to step st14.

In step st14, p is NULL, the remote server access portion 714 makes a decision as to whether or not there is a searched remote server in step st17.

If there is at least not a searched remote server, the remote server access portion 714 transmits a list of server which has been checked and a data acquiring request including the train of numbers of the target data as an argument to the remote server access portion 714 of the target server and returns the result to the source of the request in step st18.

In step st17, if there is no remote server, the remote server access portion 714 informs the source of the request of the absence of the target data in step st19.

In step st15, there is a target data, the remote server access portion 714 acquires and transfers the target data to the source of the request in step st20.

As mentioned, the target data in the servers remote from the server receiving the request can be acquired.

In the above mentioned operations, data acquiring processings are described. However, if the request is for registering the data, the target data can registered similarly.

As mentioned, data is stored in remote servers to have a decentralized structure and data can be acquired from the server which is remote with the keyword and the train of numbers of the target data without specifying the address of the remote server storing the target data.

In this embodiment, the remote server access portion is provided in the facsimile and sound server apparatus. However, it is also possible to provide the remote server access portion to the facsimile server apparatus or the sound server apparatus.

(SEVENTH EMBODIMENT)

A seventh embodiment will be described.

Figure 12:
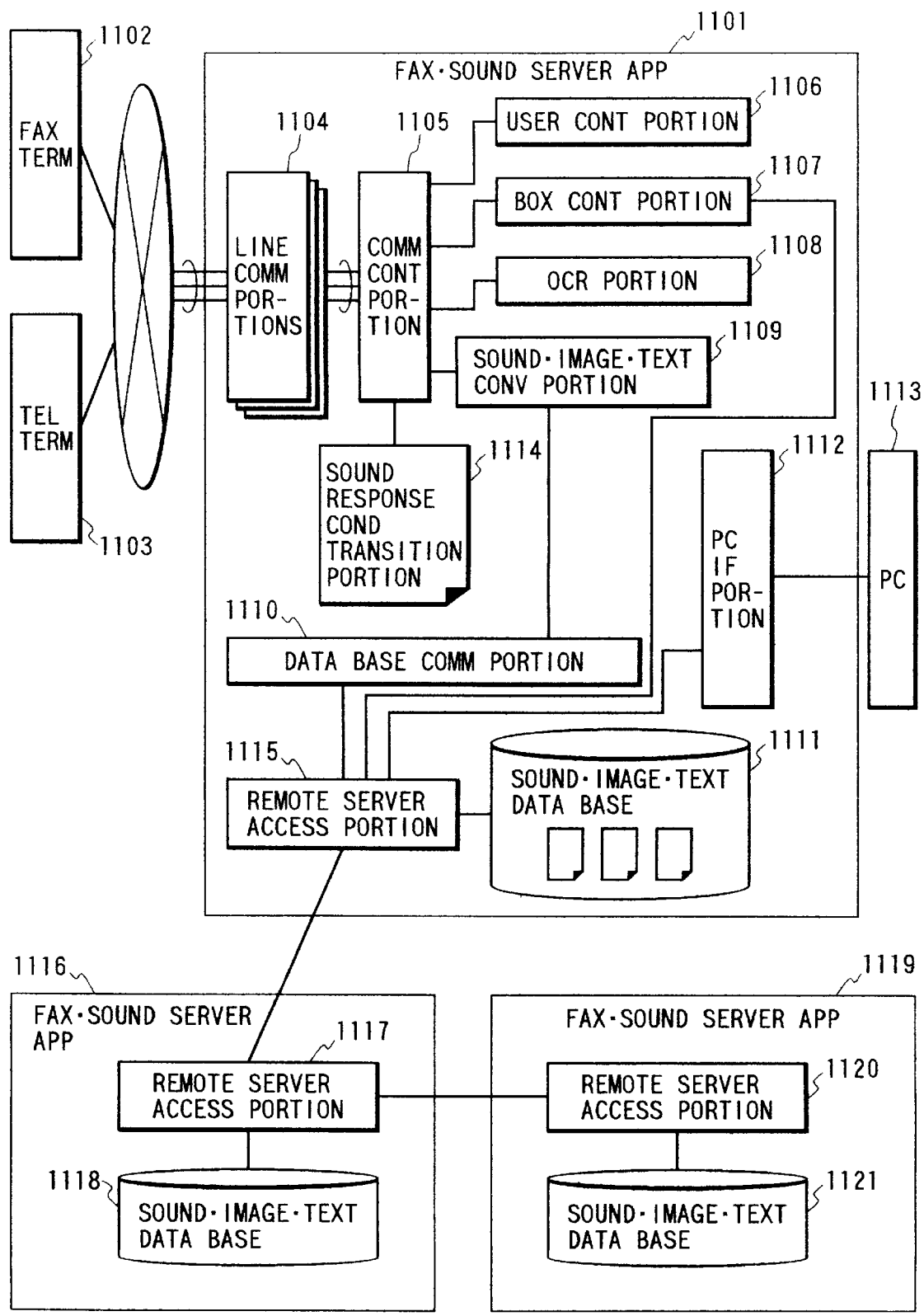
FIG. 12 is a block diagram of a facsimile and sound server apparatus of a seventh embodiment.

FIG. 12 is a block diagram of a facsimile and sound server apparatus of the seventh embodiment.

The facsimile and sound server apparatus 1101 of the seventh embodiment comprises a line communication portion 1104 having a plurality of communication ports, a communication control portion 1105, a user control portion 1106, a box control portion 1107, an OCR (optical character reader) 1108, a sound, image and text conversion portion 1109, a data base communication portion 1110, a sound, image, and text data base 1111, a personal computer interface portion 1112, a sound response condition transition portion 1114, and a remote server access portion 1115.

The basic structure and operation of the seventh embodiment are similar to those of the sixth embodiment. The difference is in that the OCR portion 1108 is further provided.

This embodiment is applied to the case that the target data to be registered or acquired is requested by the facsimile terminal 1102. That is, when data is registered, the communication control portion 1105 receiving image data from the facsimile terminal 1102 operates the OCR portion 1108 to process the data. The OCR portion 1108 extracts the data concerning the server for registration from the image data and returns the extracted data to the communication control portion 1105. The communication control portion 1105 sends the data of the server for registration and the image data to be registered to the data base communication portion 1110. The data base communication portion 1110 registers the image data to be registered in the sound, image, and text data base 1111 if the image data is to be registered in this facsimile and sound server apparatus 1101. If the data of the server to be registered is directed to another server, the data base communication portion 1110 transmits the data of the server for registration and the image data via the remoter server access portion 1115.

If target data is requested to be read, the communication control portion 1105 receiving image data from the facsimile terminal 1102 operates the OCR portion 1108 to process the data. The OCR portion 1108 extracts the data concerning to the server for data reading from the image data and returns the extracted data to the communication control portion 1105. The communication control portion 1105 sends the data of the server for data reading to the data base communication portion 1110. The data base communication portion 1110 acquires the data from the sound, image, and the data base of this facsimile and sound server apparatus 1101 or another facsimile and sound server apparatus and returns the acquired data to the facsimile terminal 1102.

As mentioned, the user can have access to the target data in the server remote from the facsimile and sound server apparatus coupled to the facsimile terminal 1102 without generating a list of data and corresponding trains of numbers including the target data in another server in the facsimile and server apparatus 1101.

In this embodiment, the remoter server access portion 1115 is provided in the facsimile and sound server apparatus 1101. However, it is also possible to provide the remoter server access portion to the facsimile server apparatus.

(EIGTH EMBODIMENT)

Figure 13:
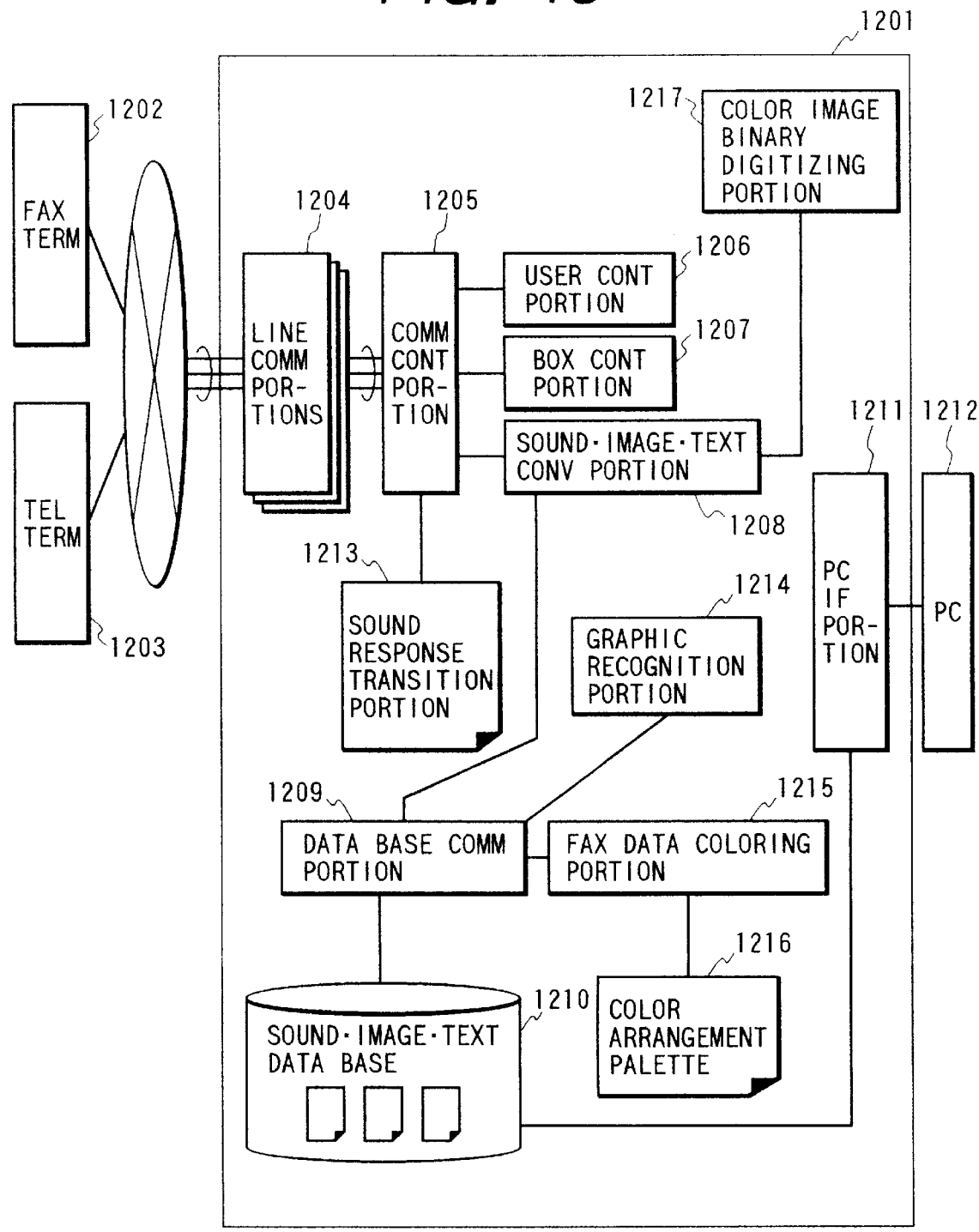
FIG. 13 is a block diagram of a facsimile and sound server apparatus of an eighth embodiment.

An eighth embodiment will be described. FIG. 13 is a block diagram of a facsimile and server apparatus of the eighth embodiment.

The facsimile and sound server apparatus 1201 of the eighth embodiment comprises a line communication portion 1204 having a plurality of communication ports, a communication control portion 1205, a user control portion 1206, a box control portion 1207, a sound, image, and text conversion portion 1208, a data base communication portion 1209, a sound, image, and text data base 1210, a personal computer interface portion 1211, a sound response condition transition portion 1213, and a graphic recognition portion 1214, a facsimile data coloring portion 1215, a color arrangement palette 1216, and a color image digitizing portion 1217.

The basic structure and operation of the eighth embodiment are similar to those of the fifth embodiment. The difference is in that the graphic recognition portion 1214, the facsimile data coloring portion 1215, the color arrangement palette 1216, and the color image binary digitizing portion 1217 are added to the facsimile and sound server apparatus 601 of the fifth embodiment.

The graphic recognition portion 1214 recognizes various figures including a triangle, a rectangular, a sentence vertically written sentence, and a horizontally written sentence or the like.

The color arrangement palette 1216 has a table for determining what color is arranged on the various figure recognized by the graphic recognizing portion 1214.

When data is registered by the facsimile terminal 1202, the data base communication portion 1209 receives the registration request, operates the graphic recognition portion 1214 to recognize the image data from the facsimile terminal 1202, operates the facsimile data coloring portion 1215 to process the result, and registers the resultant image data in the sound, image, and text data base 1210. The facsimile data coloring portion 1215 arranges the color determined in accordance with the color arrangement palette 1216 in the recognized figure.

When the facsimile terminal acquires data, the sound, image, and text conversion portion 1208 operates the color image binary digitizing portion 1217 to convert the color image data into mono-color binary image, and transmit it to the facsimile terminal 1202.

In the facsimile and sound server apparatus 1201, a color image can be used from the personal computer 1212 and the color image binary-digitized can be acquired by the facsimile terminal.

In this embodiment, the graphic recognition portion 1214, the facsimile data coloring portion 1215, the color arrangement palette 1216, the color image digitizing portion 1217 are added to the facsimile and sound server apparatus. However, it is also possible to add it to the facsimile server apparatus.

(NINTH EMBODIMENT)

Figure 14:
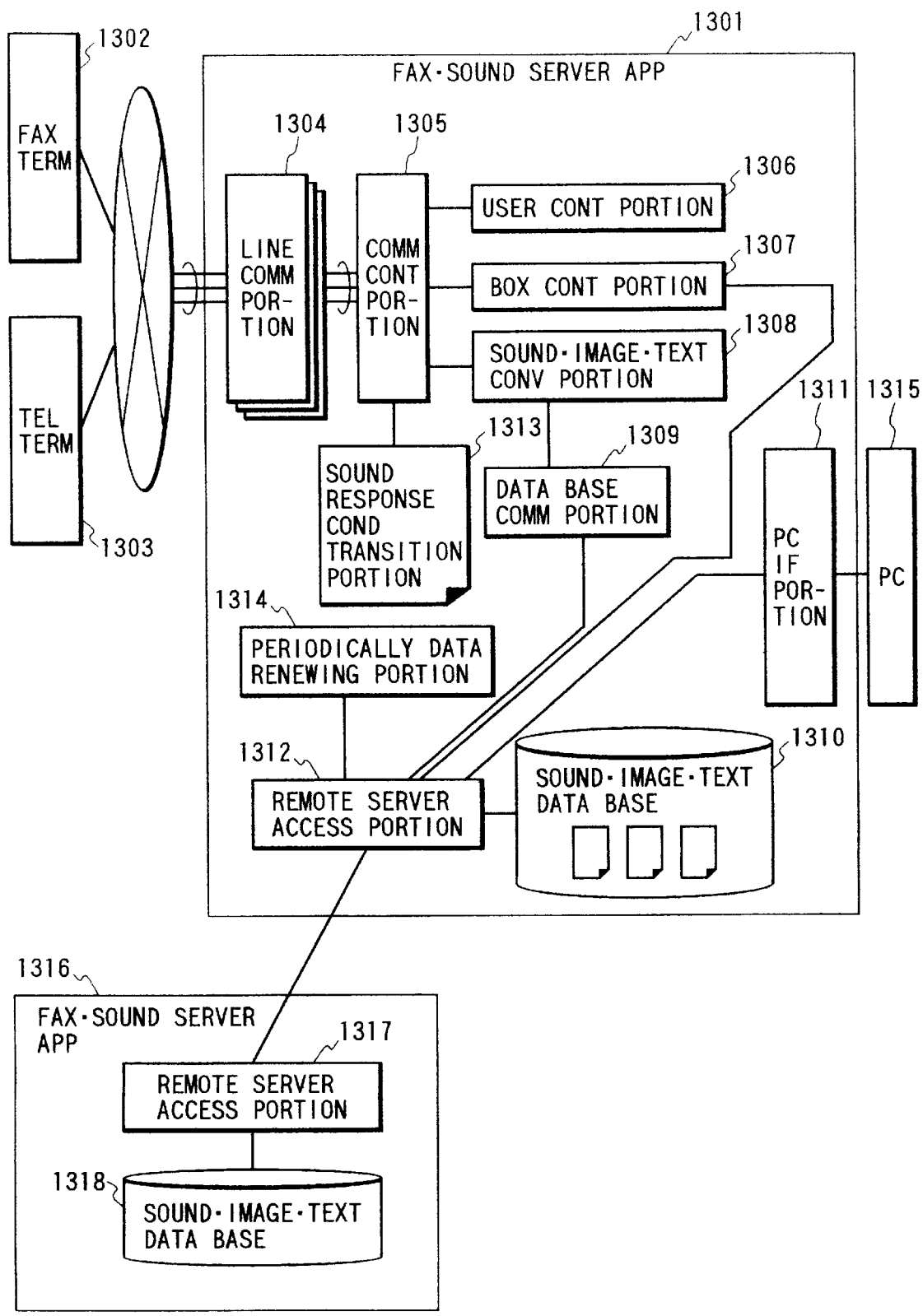
FIG. 14 is a block diagram of a facsimile and sound server of a ninth embodiment.

A ninth embodiment will be described. FIG. 14 is a block diagram of a facsimile and sound server of the ninth embodiment. The facsimile and sound server apparatus 1301 of the ninth embodiment comprises a line communication portion 1304 having a plurality of communication ports, a communication control portion 1305, a user control portion 1306, a box control portion 1307, a sound, image and text conversion portion 1308, a data base communication portion 1309, a sound, image, and text data base 1310, a personal computer interface portion 1311, a remote server access portion 1312, a sound response condition transition portion 1313, and a periodically data renewing portion 1314.

The basic structure and operation of the ninth embodiment are similar to those of the fifth embodiment. The difference is in that the periodically data renewing portion 1314 is added to the facsimile and sound server apparatus 601 of the fifth embodiment.

The periodically data renewing portion 1314 acquires the specified data through the remote server access portion 1317 of other facsimile and sound server apparatus 1316 and registers the data in the sound, image, and text data base 1310 of this facsimile and sound server apparatus 1301 periodically.

Therefore, the user communicated with the facsimile and sound server apparatus 1301 can acquire the data from the facsimile and sound server apparatus 1301 which has been registered in another facsimile and sound server apparatus 1316 and the user can acquire the target data without forwarding from another facsimile and sound server apparatus 1316, so that data transmission interval can be saved.

(TENTH EMBODIMENT)

Figure 15:
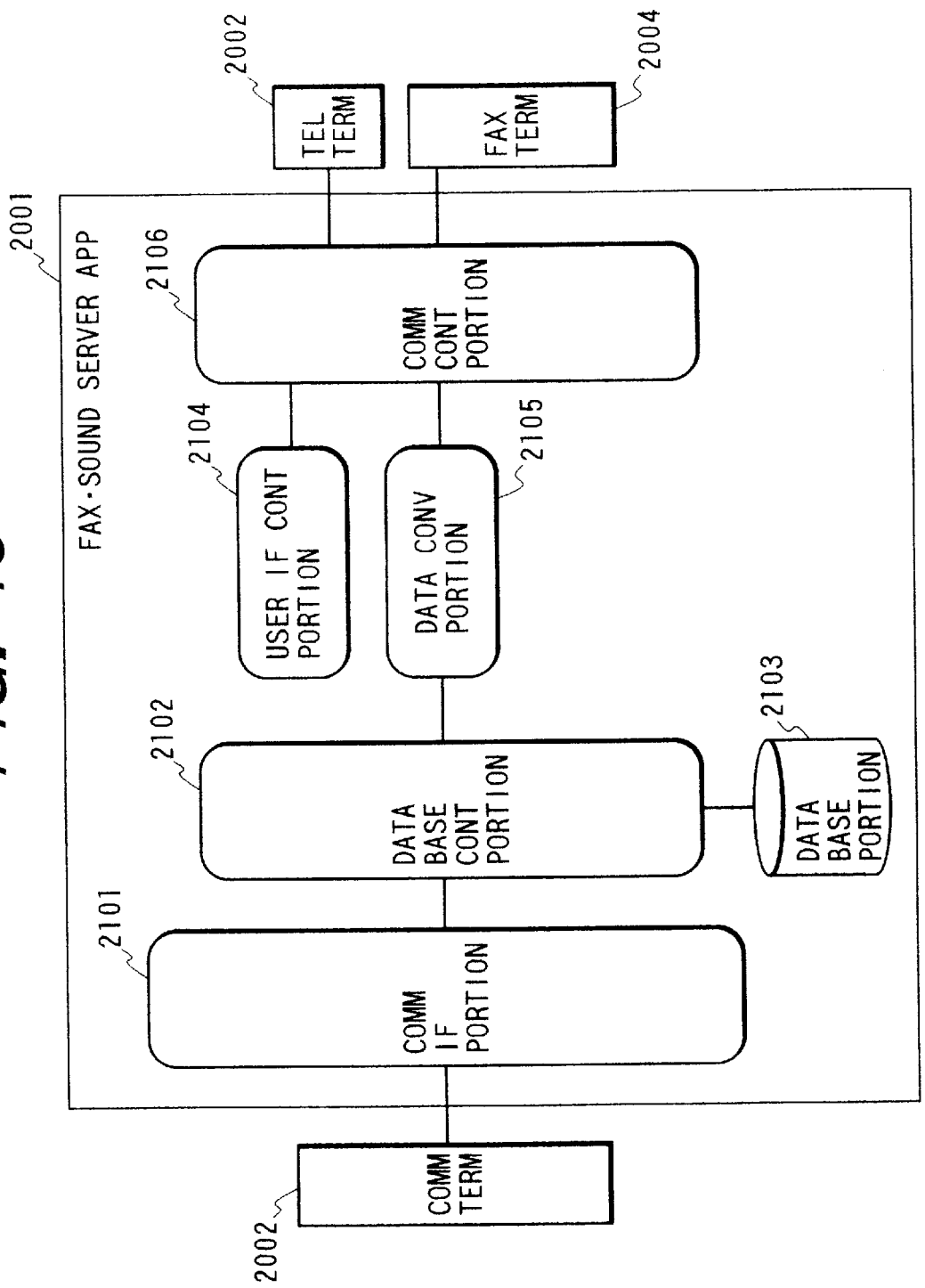
FIG. 15 is a block diagram of a facsimile and sound server of a tenth embodiment.

Hereinbelow will be described a tenth embodiment of this invention. FIG. 15 is a block diagram of a facsimile and sound server 2001 of the tenth embodiment.

The facsimile and sound server 2001 of the tenth embodiment comprises a computer interface portion 2101, a data base control portion 2102, a data base portion 2103, a user interface control portion 2104, a data conversion portion 2105, and a communication control portion 2106.

An operation will be described. It is assumed that data stored in the data base portion 2103 is acquired by the facsimile terminal 2004 and a computer terminal 2002.

At first, the operation while the data stored in the data base portion 2103 is read out by the facsimile terminal 2004 will be described.

A user calls the communication control portion 2106 from the facsimile terminal 2004. The communication control portion 2106 makes a connection with the facsimile terminal 2004. The user requests the communication control portion 2106 for "data reading" with push buttons provided to the facsimile terminal 2004 in response to a sound guidance from the communication control portion 2106.

Then, the communication control portion 2106 requires the user to input the user's ID and pass word. In response to input of user's ID and pass word, the user interface control portion 2104 checks the user's ID and pass word inputted with push buttons on the facsimile terminal 2004 as to whether the user can require execution of the function of "data reading".

As the result, when the function "data reading" is executed, the user is required to input the box number with a sound guidance.

The box number inputted is sent to the data base control portion 2102. Then, the data base control portion 2102 reads the corresponding data from the data base portion 2103. Because the data stored in the data base portion 2103 may have a format different from the format of data to be transmitted to the facsimile terminal 2004, the data conversion portion 2105 converts the data to have the format matching to the facsimile terminal 2004 when the data read from the data base portion 2103 has the format which is different from the format of data to be transmitted to the facsimile terminal 2004 and the converted data is transmitted to the facsimile terminal 2004.

At second, the operation while the data is read from the computer terminal 20002 will be described.

In response to a data reading request from the computer terminal 20002 to the computer interface portion 2101, the computer interface portion 2101 sends the data reading request to the data base control portion 2102.

The data base control portion 2102 reads the requested data from the data base portion 2103 and transmits the data to the computer terminal 2002 through the computer interface portion 2102.

As mentioned, according to this embodiment, the same data can be acquired by the facsimile terminal, a telephone terminal 2003, and the computer terminal 2002, respectively requiring different data formats or data types.

(ELEVENTH EMBODIMENT)

Figure 16:
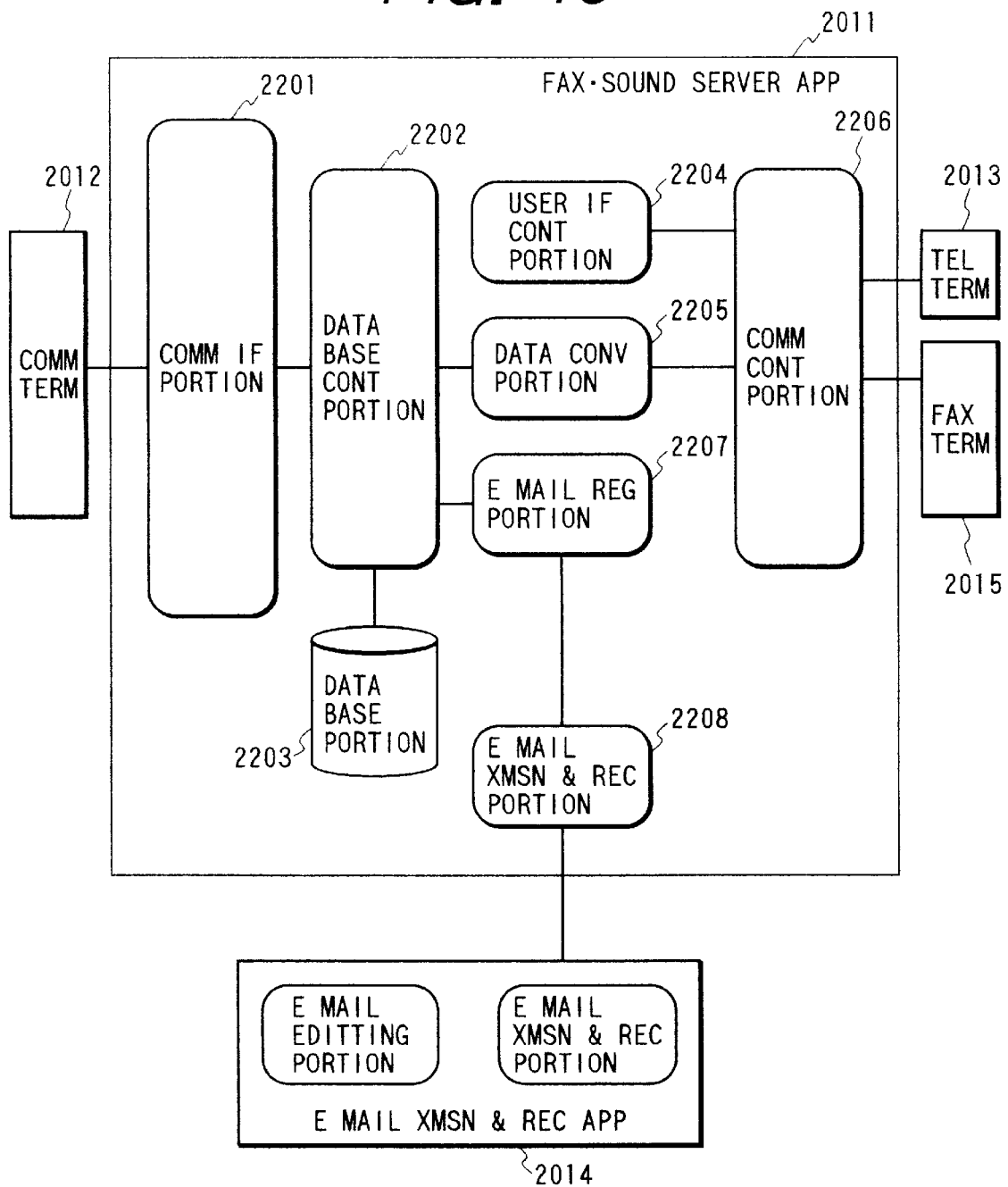
FIG. 16 is a block diagram of a facsimile and sound server apparatus of an eleventh embodiment.

An eleventh embodiment will be described. FIG. 16 is a block diagram of a facsimile and sound server apparatus of an eleventh embodiment.

The facsimile and sound serve apparatus 2011 of the eleventh embodiment comprises a computer interface portion 2201, a data base control portion 2202, a data base portion, a user interface portion, a data conversion portion 2205, a communication control portion 2206, an electronic mail registration portion 2207, and an electronic mail transmitting and receiving portion 2208.

An operation while an electronic mail transmitted from an external electronic mail terminal is registered in the data base portion 2203 will be described.

At first, an electronic mail provided with the external electronic mail terminal 2214 by a third party is transmitted to the electronic mail transmitting and receiving portion 2208 through a computer network such as the Internet. The electronic mail transmitting and receiving portion 2208 sends the received electronic mail to the electronic mail registration portion 2207. The electronic mail registration portion 2207 analyzes the electronic mail and converts it to have a format matched to the data base portion 2203 and stores the converted data in the data base portion 2203 through the data base control portion 2202.

According to the operation mentioned above, the electronic mail having a general format can be registered in the data base portion 2203. Therefore, if the user cannot directly operate the data base, the user can register the data of the electronic mail without directly accessing the data base portion 2203.

Moreover, if the format of the electronic mail comply with MIME and the format of the data base is HTML, the electronic mail may have data having a plurality of data formats hierarchically. Moreover, the data base may have a function to link data having the HTML format to other data. In such a case, a plurality of sets of data provided remotely from the data base portion 2203 are transmitted together in one electronic mail and the electronic mail conversion portion 2205 recognizes the sets of data as respective files, so that these sets of data can be registered with a data structure which is the same as that before transmission.

According to this operation, though the plurality of sets of data have any formats, the data can be registered together.

(TWELFTH EMBODIMENT)

Figure 17:
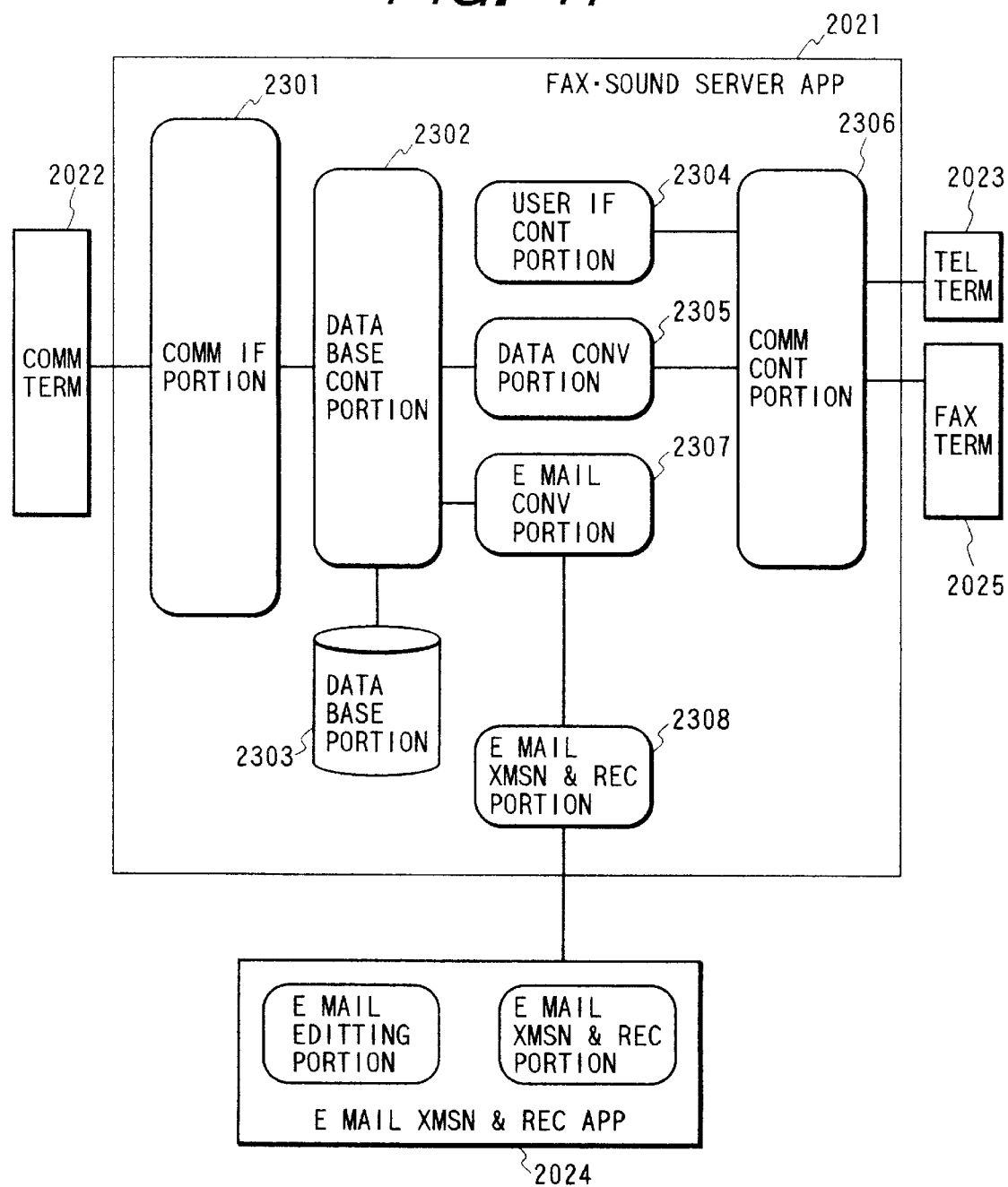
FIG. 17 is a block diagram of a facsimile and sound server apparatus of a twelfth embodiment.
Figure 25:
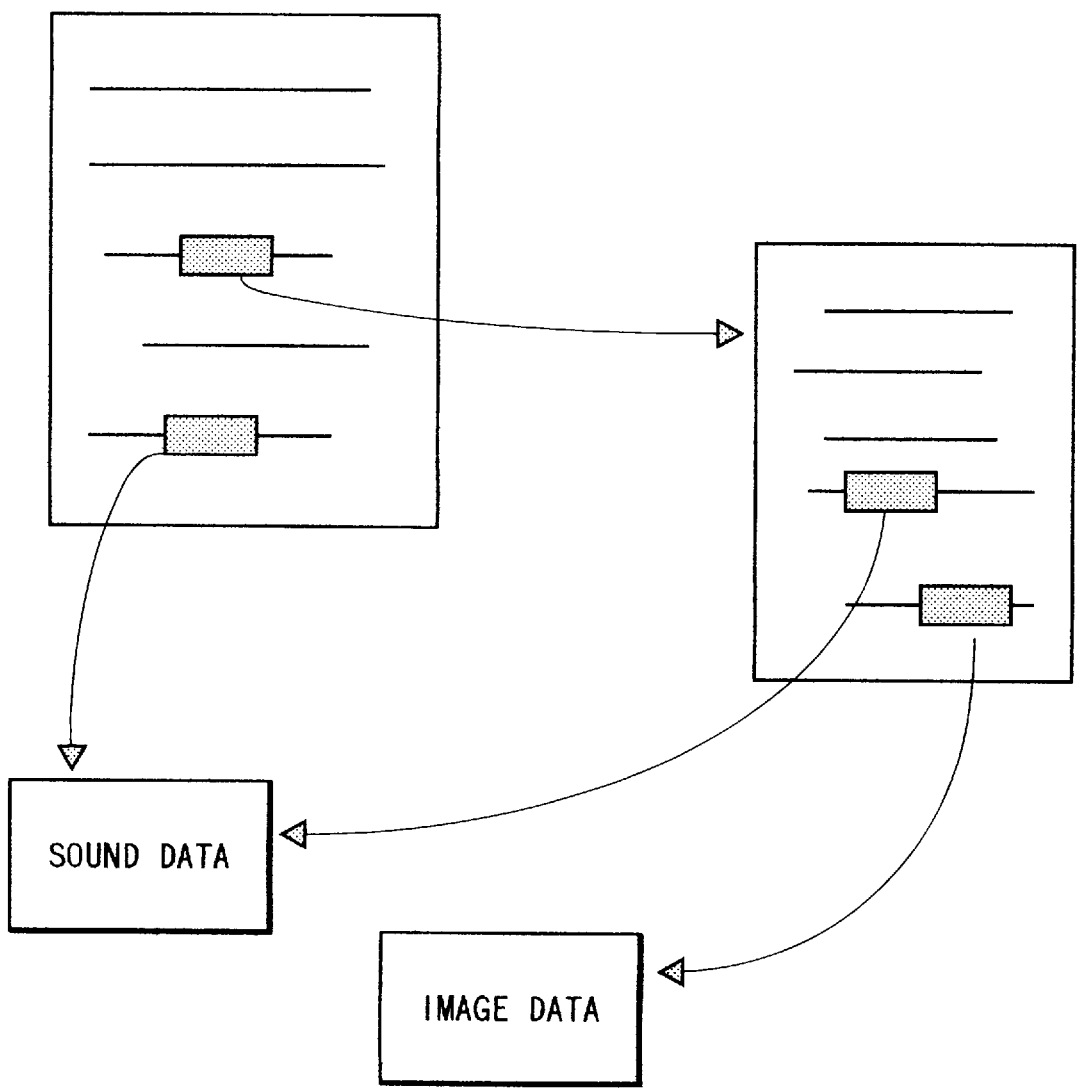
FIG. 25 is an illustration of the twelfth embodiment showing a data format.

A twelfth embodiment will be described. FIG. 17 is a block diagram of a facsimile and sound server apparatus 2021 of the twelfth embodiment. FIG. 25 is an illustration of the twelfth embodiment showing a data format.

The facsimile and sound server apparatus of the twelfth embodiment comprises a computer interface portion 2301, a data base control portion 2302, a data base portion 2303, a user interface portion 2304, a data conversion portion 2305, a communication control portion 2306, an electronic mail conversion portion 2307, and an electronic mail transmission and receiving portion 2308.

An operation in the case that the data stored in the data base portion 2303 is transmitted as an electronic mail will be described.

At first, the electronic mail conversion portion 2307 reads the specified data in the data base portion 2303 at a given timing.

The read data is converted to have the format of the electronic mail by the electronic mail conversion portion 2307 and transmitted to the destination thorough the electronic mail transmission and receiving portion 2308.

Moreover, when the electronic mail transmission and receiving portion 2308 can deal the MIME type format, the electronic mail transmission and receiving portion 2308 can transmit data having the same structure as data having the HTML type format when it was stored.

For example, it is assumed that there is a data base having a structure shown in FIG. 25. The data base control portion 2302 analyzes link data in each set of data and if the link data is set to "reading only the specified page", the data base control portion 2302 reads only the specified page. If the link data is set to "reading all linked data", the data base control portion 2302 searches all data linked by tracing the link data and the electronic mail conversion portion 2307 and combines them as an electronic mail having the MIME format. The electronic mail is transmitted to the specified destination by the electronic mail transmission and receiving portion 2308.

In this operation, the electronic mail may be transmitted periodically or at a time when the data in the data base is changed.

Moreover, in this embodiment, it is also possible that data can be manually transmitted by specifying the destination and contents in the data base.

Then, if the contents in the data base periodically vary, a data requesting user remote from the data base can surely acquire the variation of the contents in the data base by periodically transmitting the data as the electronic mail.

Moreover, effecting the transmission processing at the timing when the data is changed, a mirroring can be effected among a plurality of data base.

(THIRTEENTH EMBODIMENT)

Figure 18:
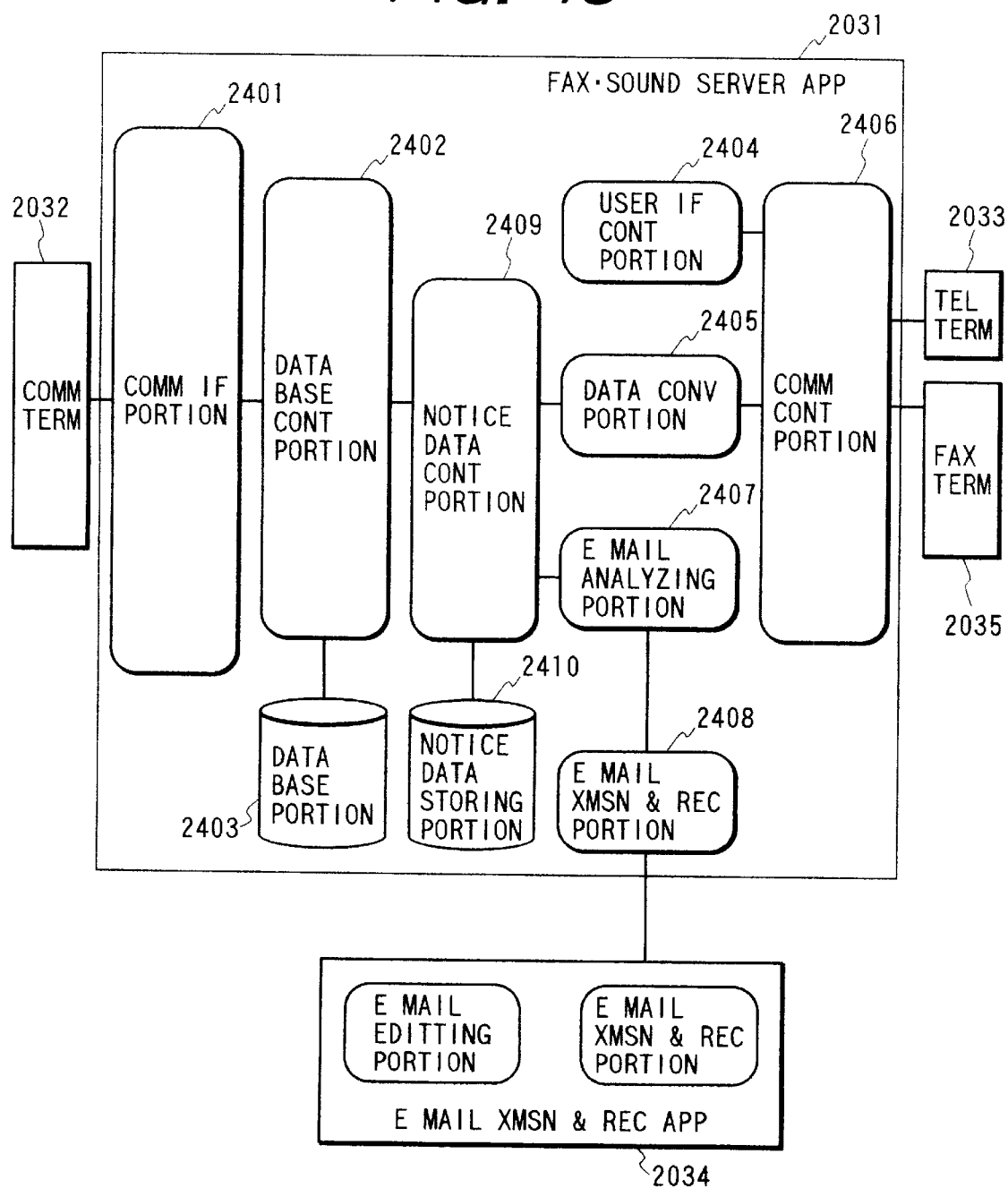
FIG. 18 is a block diagram of a facsimile and sound server apparatus of a thirteenth embodiment.

A thirteenth embodiment will be descried. FIG. 18 is a block diagram of a facsimile and sound server apparatus 2031 of the thirteenth embodiment.

The facsimile and sound server apparatus 2031 of the thirteenth embodiment comprises a computer interface portion 2401, a data base control portion 2402, a data base portion 2403, a user interface portion 2404, a data conversion portion 2405, a communication control portion 2406, an electronic mail analyzing portion portion 2407, an electronic mail transmission and receiving portion 2408, a notice data control portion 2409, a notice data storing portion 2410.

An operation of the facsimile and sound server apparatus 2031 having the structure mentioned above with respect to setting the notice data from an electronic mail will be described.

At first, an electronic mail arrives at the electronic mail transmission and receiving portion 2408 through a computer network such as the Internet. The electronic mail transmission and receiving portion 2408 sends the received electronic mail to the electronic mail analyzing portion 2407.

The electronic mail analyzing portion 2407 analyzes the content of the electronic mail and if the electronic mail analyzing portion 2407 recognizes that the electronic mail is for setting of the notice data, the electronic mail analyzing portion 2407 informs the notice data control portion 2409 of this. During this operation, if notice data is attached to the data of the electronic mail, the electronic mail analyzing portion 2407 sends the notice data together to the notice data control portion 2409. The notice data control portion 2409 recognizes the notice data when the notice data is attached and when no notice data is attached, the notice data control portion 2409 recognizes data stored in the notice data storing portion 2410 as the notice data.

In the case that the notice data has been set, when data in the data base portion 2403 is read from a facsimile terminal or a telephone terminal, the notice data is automatically outputted during a sound guidance to inform the notice data to the user.

When data in the data base portion 2403 is read from a computer terminal 2032, the notice data is displayed on a display screen.

When the notice data setting is released by an electronic mail, the notice data control portion 2409 stops outputting the notice data thereafter.

In this facsimile and sound server apparatus 2031, the sound from the telephone terminal 2033 can be registered, so that it is possible to register the notice data from the telephone terminal.

Therefore, the manager of the server apparatus is remote from the server apparatus which can set data remotely. For example, this is useful for the case that an administrative organ informs residents of notices such as a festival, or important information of a large-scale disaster at night.

Moreover, it is also possible to change the outputting system of the sound guidance by utilizing the notice data inputting from an electronic mail. For example, in a data supplying system in a local self-governing body, at a normal condition, a sound guidance supplies a general use data. However, at a disaster, it is possible to provide suitable data by changing the sound guidance for general use to the sound guidance for disaster by the telephone or the electronic mail.

(FOURTEENTH EMBODIMENT)

Figure 19:
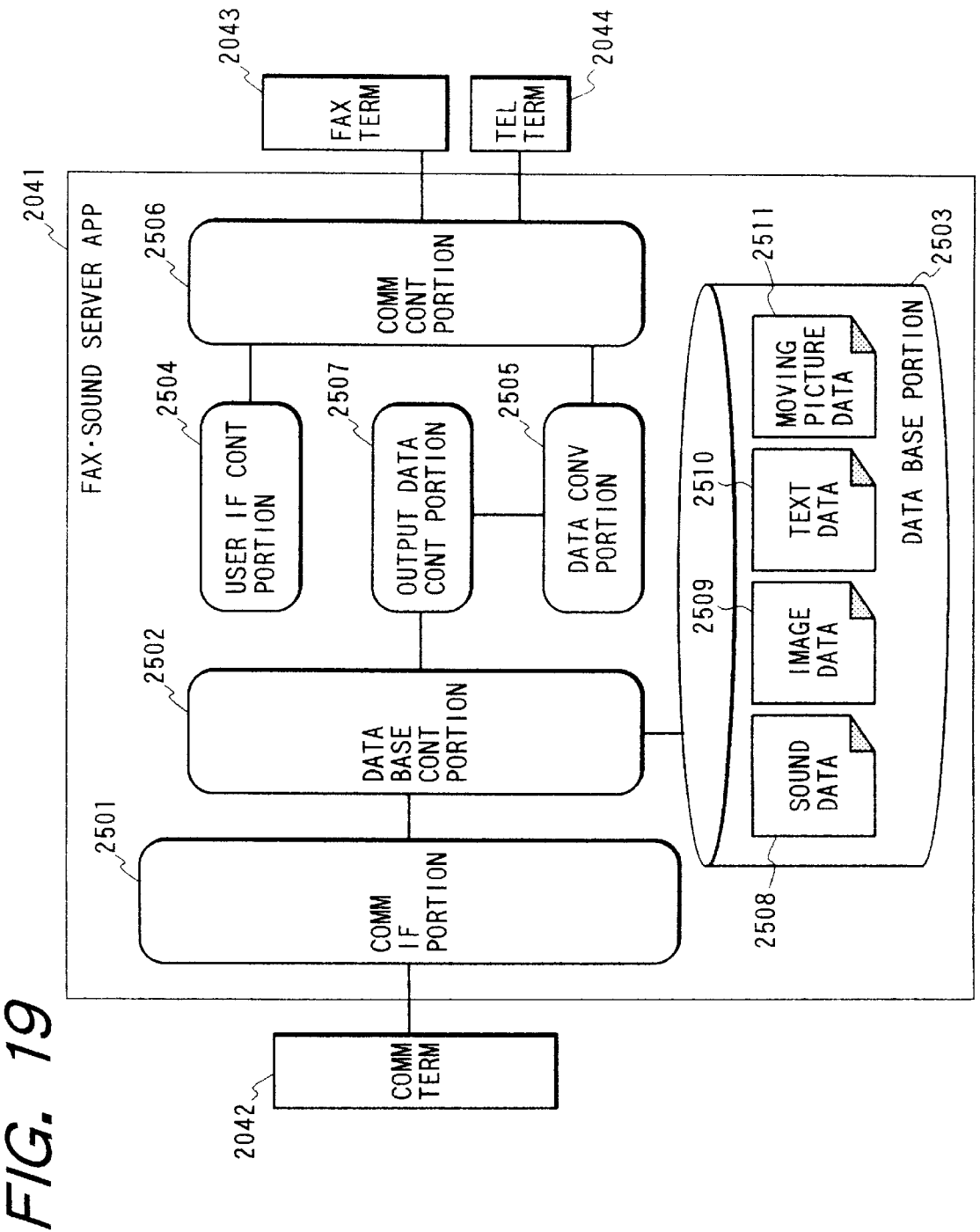
FIG. 19 is a block diagram of a facsimile and sound server apparatus of a fourteenth embodiment.

A fourteenth embodiment will be descried. FIG. 19 is a block diagram of a facsimile and sound server apparatus 2041 of the fourteenth embodiment.

The facsimile and sound server apparatus 2041 of the fourteenth embodiment comprises a computer interface portion 2501, a data base control portion 2502, a data base portion 2503, a user interface portion 2504, a data conversion portion 2505, a communication control portion 2506, and an outputting control portion 2507.

The data base portion 2502 stores sound data 2508, image data 2509, text data 2510, and moving picture data 2511.

An operation of the facsimile and sound server apparatus 2041 having the structure mentioned above when data is acquired from the facsimile terminal 2043 will be described.

At first, a user calls the communication control portion 2506 from a facsimile terminal 2043. The communication control portion 2506 makes a connection to the facsimile terminal 2043. The user inputs and sends "data reading" in response to a sound guidance from the communication control portion 2506 using push buttons on the facsimile terminal 2043.

The communication control portion 2506 requests the user to input its user ID and password with the sound guidance. The user interface control portion 2504 checks the user ID and the password as to whether the user is allowed to execute the function of "data reading".

If the user interface control portion 2504 allows the user to execute the function "data reading", the communication control portion 2506 requests the user to input its box number with the sound guidance.

The inputted box number is sent to the data base control portion 2502 and the data base control portion 2502 reads the corresponding data from the data base portion 2503. The data base portion 2503 stores the sound data 2508, the image data 2509, text data 2510, and moving picture data 511. Among these data, the text data 2510 is converted into sound data by a sound synthesizing or into image data by a text to image converting in the data converting portion 2505. The moving picture data is converted into sound data by extracting sound data or into image data by a frame extraction. Which type of data the read data is converted into is determined by the setting in the data conversion portion 2505.

When the read data is converted into either of the sound data or the image data, the output data control portion 2507 outputs only sound data successively. During this operation, if there is image data accompanied with the data under outputting, the output data control portion 2507 informs the facsimile terminal 2043 of the presence of the image data through the communication control portion 2506.

On the completion of the outputting sound data, the outputting control portion 2507 outputs image data successively through the communication control portion 2506 to the facsimile terminal 2043.

Therefore, various types of data stored in the data base portion 2503 can be transmitted to the facsimile terminal 2043 with the type of data matched to the facsimile terminal 2043.

If a telephone terminal 2044 requests data, the data conversion portion 2505 converts the read text data into sound data using the sound synthesizing and converts read moving picture data into sound data by extracting sound data to provide the data other than the image data.

Moreover, after transmitting a message "image data is present" a message "Do you need this image data? Push "1" if necessary, push "3" if unnecessary" is transmitted, so that the user can selects either course. Though in the conventional facsimile data serve, the data stored in the data box in the server can be read collectively. However, this operation makes the user possible to acquire only necessary data.

Therefore, a sheet of facsimile paper and an interval of transmission data can be saved. Moreover, the sound data and image data can be effected at the same connection to the line, so that the operation by the user is made simple and the charge for a call can be saved.

(FIFTEENTH EMBODIMENT)

Figure 20:
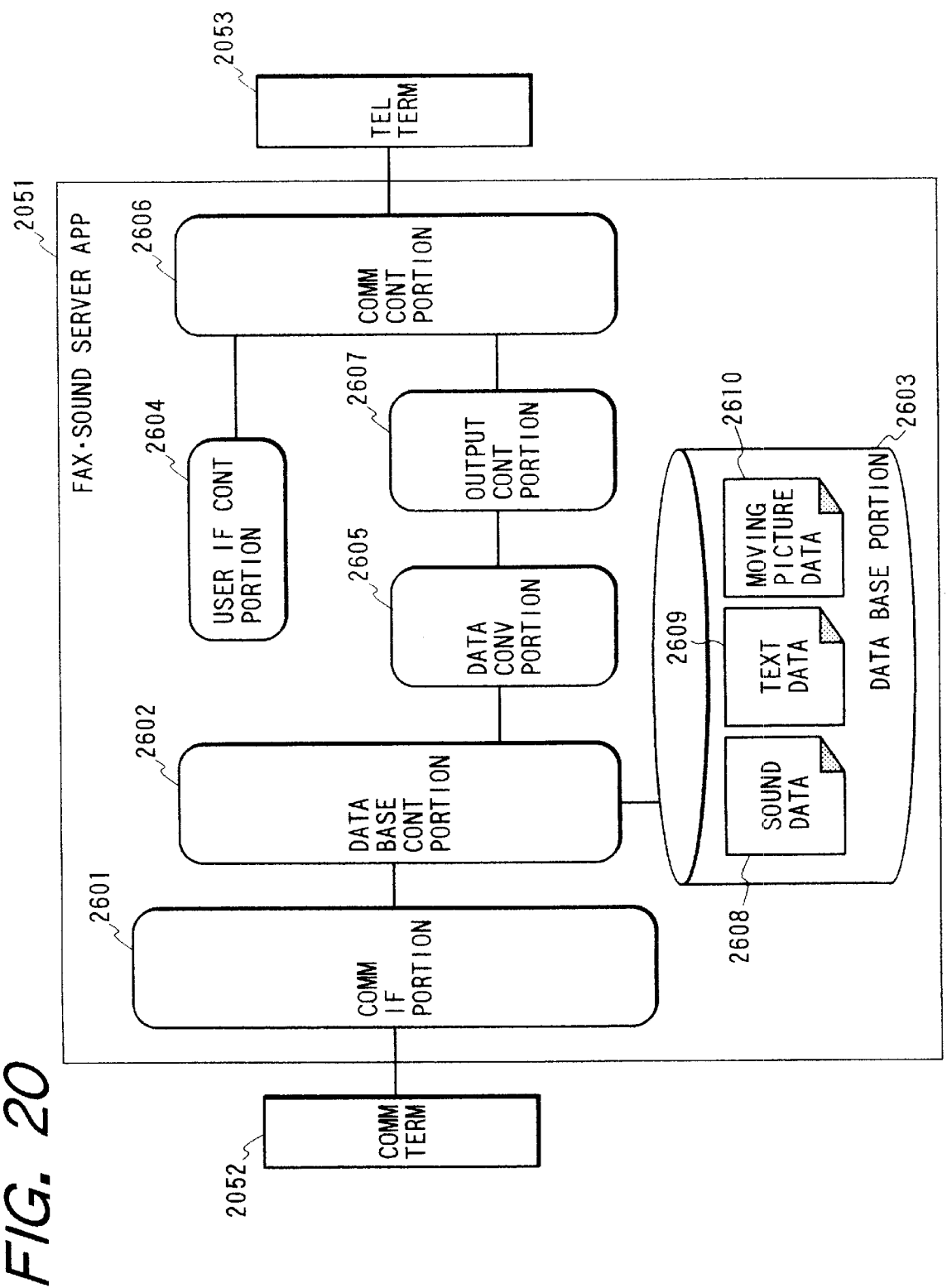
FIG. 20 is a block diagram of a facsimile and sound server apparatus of a fifteenth embodiment.

A fifteenth embodiment will be described. FIG. 20 is a block diagram of a facsimile and sound server apparatus 2051 of the fifteenth embodiment.

The facsimile and sound server apparatus 2051 of the fifteenth embodiment comprises a computer interface portion 2601, a data base control portion 2602, a data base portion 2603, a user interface portion 2604, a data conversion portion 2605, a communication control portion 2606, and an outputting control portion 2607.

The data base portion 2602 stores sound data 2608, text data 2609, and moving picture data 2610.

An operation of the facsimile and sound server apparatus 2051 having the structure mentioned above will be described in the case that data is acquired from the telephone terminal 2053.

At first, a user calls the communication control portion 2606 from a telephone terminal 2053. The communication control portion 2606 makes a connection to the telephone terminal 2053 . The user inputs and sends a request "data reading" in response to a sound guidance from the communication control portion 2606 using push buttons on the facsimile terminal 2053.

The communication control portion 2606 requests the user to input its user ID and password with the sound guidance. The user interface control portion 2604 checks the user ID and the password as to whether the user is allowed to execute the function of "data reading".

If the user interface control portion 2604 allows the user to execute the function "data reading", the communication control portion 2606 requests the user to input its box number with the sound guidance.

The inputted box number is sent to the data base control portion 2602 and the data base control portion 2602 searches and reads the corresponding data from the data base portion 2603.

The sound data 2608, the text data 2610, and moving picture data 2610 are sent to the data conversion portion 2605 from the data base control portion 2602. The data conversion portion 2605 converts all read data into data of which type matches to the telephone terminal 2053 and the converted data is transmitted to the telephone terminal 2053 through the communication control portion 2606. On every completion of outputting one set of data, a sound message requesting the next operation is sent. In response to this, the user selectively commands an operation such as "reproducing the next data", "transmission of the same data", or "reproducing the top data" by depressing push buttons. The output control portion 2607 recognizes the command and executes the next processing.

Therefore, the operations of the facsimile and sound server are selectively provided to the user of the telephone terminal 2053.

(SIXTEENTH EMBODIMENT)

Figure 21:
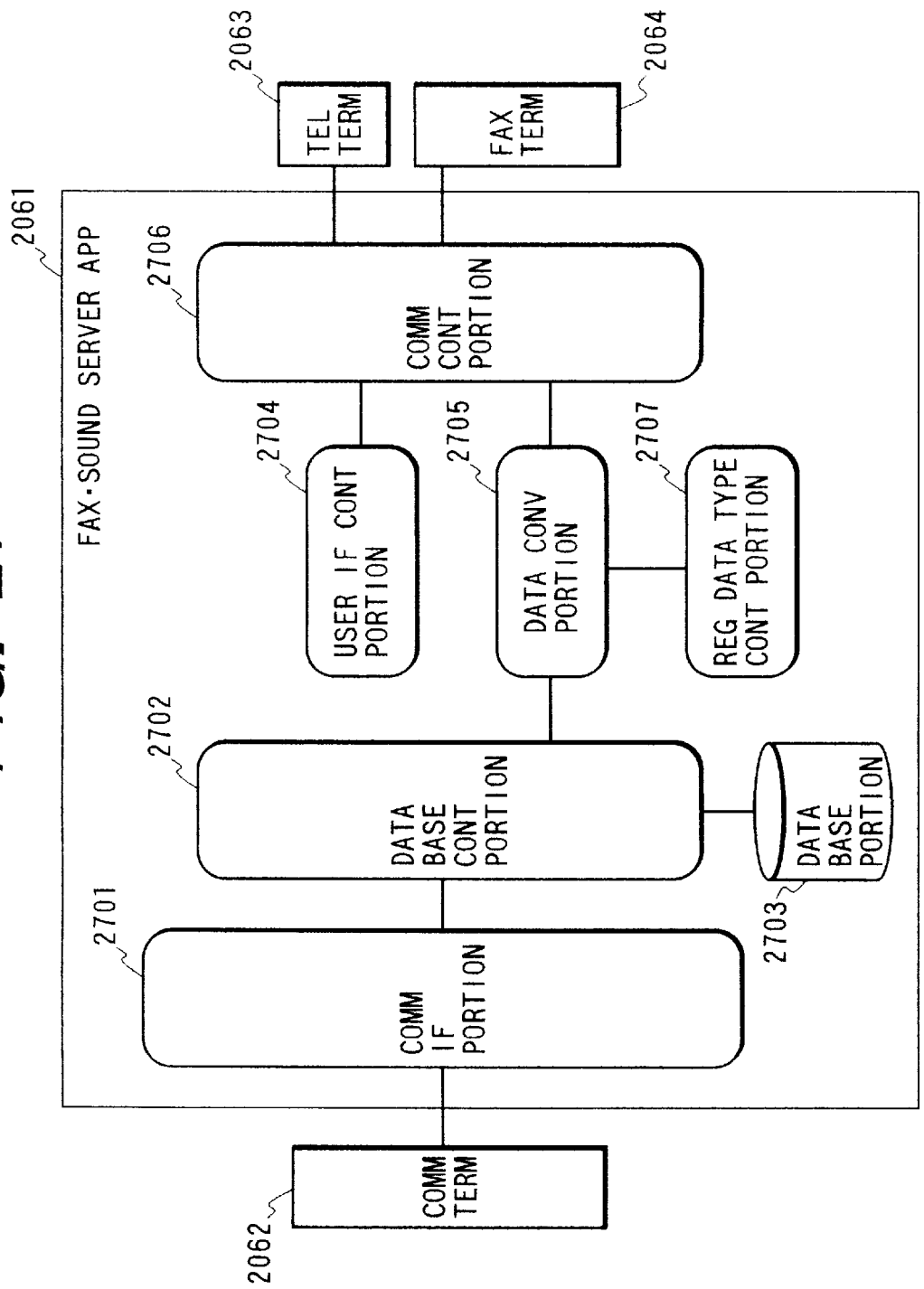
FIG. 21 is a block diagram of a facsimile and sound server apparatus of a sixteenth embodiment.

A sixteenth embodiment will be described. FIG. 21 is a block diagram of a facsimile and sound server apparatus of the sixteenth embodiment.

The facsimile and sound server apparatus 2061 of the sixteenth embodiment comprises a computer interface portion 2701, a data base control portion 2702, a data base portion 2703, a user interface portion 2704, a data conversion portion 2705, a communication control portion 2706, and a registration data format control portion 2707.

An operation of the facsimile and sound server apparatus having the structure mentioned above will be described in the case that data is registered from a telephone terminal 2063.

At first, a user calls the communication control portion 2706 from a telephone terminal 2063. The communication control portion 2706 makes a connection to the telephone terminal 2064. The user inputs and sends a request "data registration" in response to a sound guidance from the communication control portion 2706 using push buttons on the telephone terminal 2063.

The communication control portion 2706 requests the user to input its user ID and password with the sound guidance. The user interface control portion 2704 checks the user ID and the password as to whether the user is allowed to execute the function of "data registration".

If the user interface control portion 2704 allows the user to effect the function "data registration", the communication control portion 2706 requests the user to input its box number with the sound guidance.

When the user inputs the box number, the inputted box number and data to be registered are sent to the data base control portion 2702. The data is registered in the data base portion 2703 and the type of the data is stored in the registered data type control portion 2707.

According to the operation mentioned above, the data conversion processing which spends a large portion of time for data reading can be possibly saved, so that a total interval of the reading operation can be considerably saved.

For example, it is assumed that the data registered by the computer terminal 2062 having the JPEG format is stored in the data base portion 2703 in the JPEG format. When this data is transmitted to the facsimile terminal 2064, the data conversion 2705 converts the data into data having the facsimile image format and transmits it to the facsimile terminal 2064 and at the same time the converted data is stored in the data base portion 2703 and data indicating that the data of the facsimile image type is present in the data base portion 2703 is further stored in the registration data type control portion 2707.

According to this operation, at the next request for transmitting this data in the facsimile image format, this data can be transmitted to another facsimile terminal without conversion. Therefore, an interval necessary for transmitting data to the facsimile terminal is saved compared with the transmission processing requiring the conversion operation for every transmission to the facsimile terminal.

(SEVENTEENTH EMBODIMENT)

Figure 22:
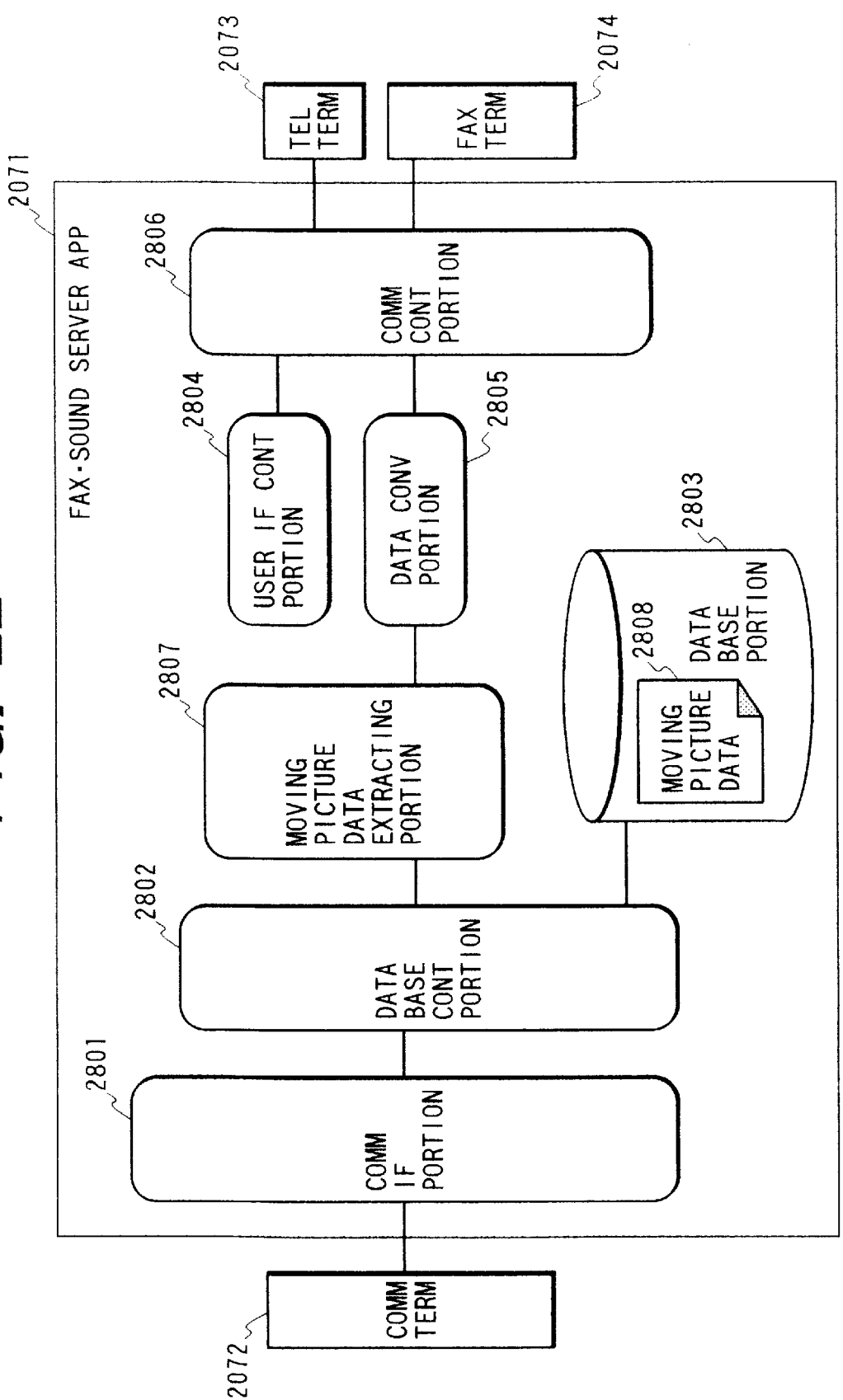
FIG. 22 is a block diagram of a facsimile and sound server apparatus of a seventeenth embodiment.

A seventeenth embodiment will be descried. FIG. 22 is a block diagram of a facsimile and sound server apparatus 2071 of the seventeenth embodiment.

The facsimile and sound server apparatus 2701 of the seventeenth embodiment comprises a computer interface portion 2801, a data base control portion 2802, a data base portion 2803, a user interface portion 2804, a data conversion portion 2805, a communication control portion 2806, and a moving picture data extracting portion 2807.

An operation of the facsimile and sound server apparatus 2021 having the structure mentioned above will described in the case that data is acquired from a telephone terminal 2073 and a facsimile terminal 2074.

At first, an example that a telephone terminal 2073 acquires data will be described.

A user calls the communication control portion 2806 from the telephone terminal 2073. The communication control portion 2806 makes a connection to the telephone terminal 2073. The user inputs and sends a request "data reading" in response to a sound guidance from the communication control portion 2806 using push buttons on the telephone terminal 2073.

The communication control portion 2806 may request the user to input its user ID and password with the sound guidance. The user interface control portion 2804 checks the user ID and the password as to whether the user is allowed to execute the function of "data reading".

If the user interface control portion 2804 allows the user to effect the function "data reading", the communication control portion 2806 requests the user to input its box number with the sound guidance.

When the user inputs the box number, the inputted box number is sent to the data base control portion 2802. The data is searched from the data base portion 2803.

Moving picture data 2808 stored in the data base portion 2803 is transmitted to the moving picture data extracting portion 2807. The moving picture data extracting portion 2807 extracts only sound data from the moving picture data 2808 and converts it into data having the format matching to the telephone terminal 2073 and transmits the converted data to the telephone terminal 2073 through the communication control portion 2806.

An example when data is acquired from the facsimile terminal 2074 will be described.

A user calls the communication control portion 2806 from the facsimile terminal 2074. The communication control portion 2806 makes a connection to the facsimile terminal 2074. The user inputs and sends the request "data reading" in response to a sound guidance from the communication control portion 2806 using push buttons on the facsimile terminal 2074.

The communication control portion 2806 may request the user to input its user ID and password with the sound guidance. The user interface control portion 2804 checks the user ID and the password as to whether the user is allowed to execute the function of "data reading".

If the user interface control portion 2804 allows the user to effect the function "data reading", the communication control portion 2806 requests the user to input its box number with the sound guidance.

When the user inputs the box number, the inputted box number is sent to the data base control portion 2802. The data is searched from the data base portion 2803.

Moving picture data 2808 stored in the data base portion 2803 is transmitted to the moving picture data extracting portion 2807. The moving picture data extracting portion 2807 extracts only sound data from the moving picture data 2808 and converts it into data having the format matching to the telephone function of the facsimile terminal 2074 and transmits the converted data to the facsimile terminal 2074 through the communication control portion 2806 as a sound signal.

The moving picture data 2808 stored in the data base portion 2803 is transmitted to the moving picture data extracting portion 2807. The moving picture data extracting portion 2807 extracts an optimum frame representing the moving picture data from the moving picture data 2808 and transmits the moving picture data to the facsimile terminal 2074 through the communication control portion 2806.

Then, an operation will be described in the case that data is read from a computer terminal 2072.

The computer terminal 2072 transmits the data reading request to the computer interface portion 2801. In response, the computer interface portion 2801 sends the request to the data base control portion 2802.

The data base control portion 2802 reads the requested data from the data base portion 2803 and transmits the data to the computer terminal 2072 through the computer interface portion 2801.

In this case, an OCR is further provided and the OCR extracts text data from image data and the extracted text data is transmitted to the computer terminal 2072 as text data.

Therefore, one type of data stored in the data base portion 2803 can be provided to various type of terminals by the data conversion portion 2085 for converting one type of data into data having a format matching to the terminal type.

For example, if moving data including a speech is stored in the data base portion 2803, the telephone terminal 2073 can hear the speech and the facsimile terminal 2074 can obtain an image of the speech in addition to the sound of the speech. On the computer terminal 2072, the user can watch the moving picture image of the speech on the screen.

(EIGHTEENTH EMBODIMENT)

Figure 23:
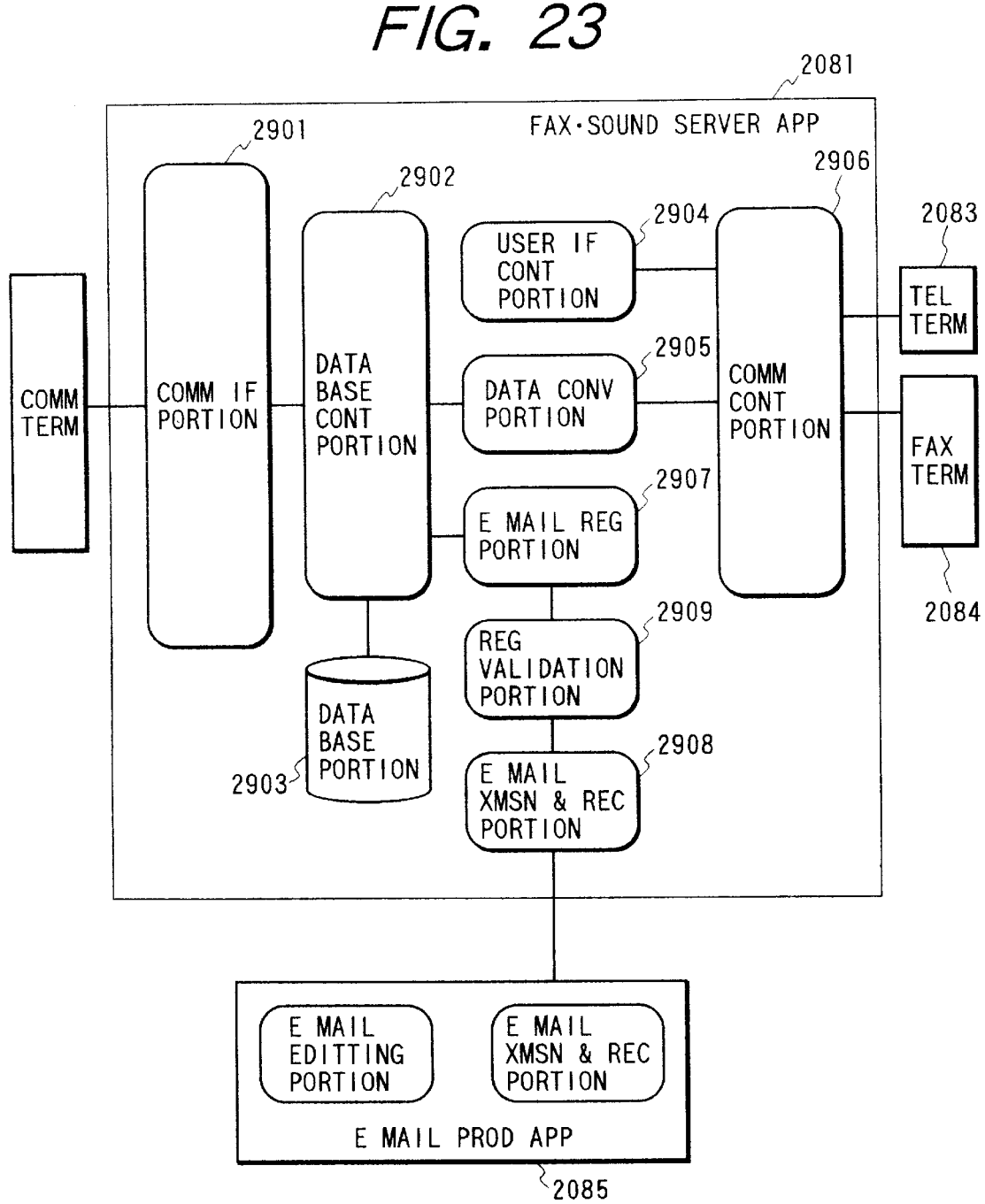
FIG. 23 is a block diagram of a facsimile and sound server apparatus of an eighteenth embodiment.

An eighteenth embodiment will be descried. FIG. 23 is a block diagram of a facsimile and sound server apparatus 2081 of the eighteenth embodiment.

The facsimile and sound server apparatus 2081 of the eighteenth embodiment comprises a computer interface portion 2901, a data base control portion 2902, a data base portion 2903, a user interface portion 2904, a data conversion portion 2905, a communication control portion 2906, an electronic mail registration portion 2907, an electronic mail transmission and receiving portion 2908, and a registration validation portion 2909.

An operation of the facsimile and sound server apparatus 2081 having the structure mentioned above will described in the case that data from an external electronic mail apparatus 2085 is registered in the data base portion 2903.

At first, an electronic mail produced by the electronic mail production apparatus 2085 arrives at the electronic mail transmission and receiving portion 2908 through an electronic mail network. The electronic mail transmission and receiving portion 2908 sends the received electronic mail to the registration validation portion 2909. The registration validation portion 2909 checks the validation data added to the electronic mail. The validation data is located at a header portion of the electronic mail or at the beginning of body in the electronic mail having the MIME format. Moreover, the validation data includes data of a user password, searching data, encoded data or the like. When the electronic mail is validated, the content of the electronic mail is sent to the electronic mail registration portion 2907. If the electronic mail is judged to be not registered, the electronic mail is abandoned. The electronic mail registration portion 2907 analyzes the content of the electronic mail and converts the data to have the format of the data base and stores the converted data in the data base portion 2903 through the data base control portion 2902 as data of data base.

As mentioned, the validation function is provided to registration of the electronic mail, so that the registration data remotely is provided with a security.

(NINETEENTH EMBODIMENT)

Figure 24:
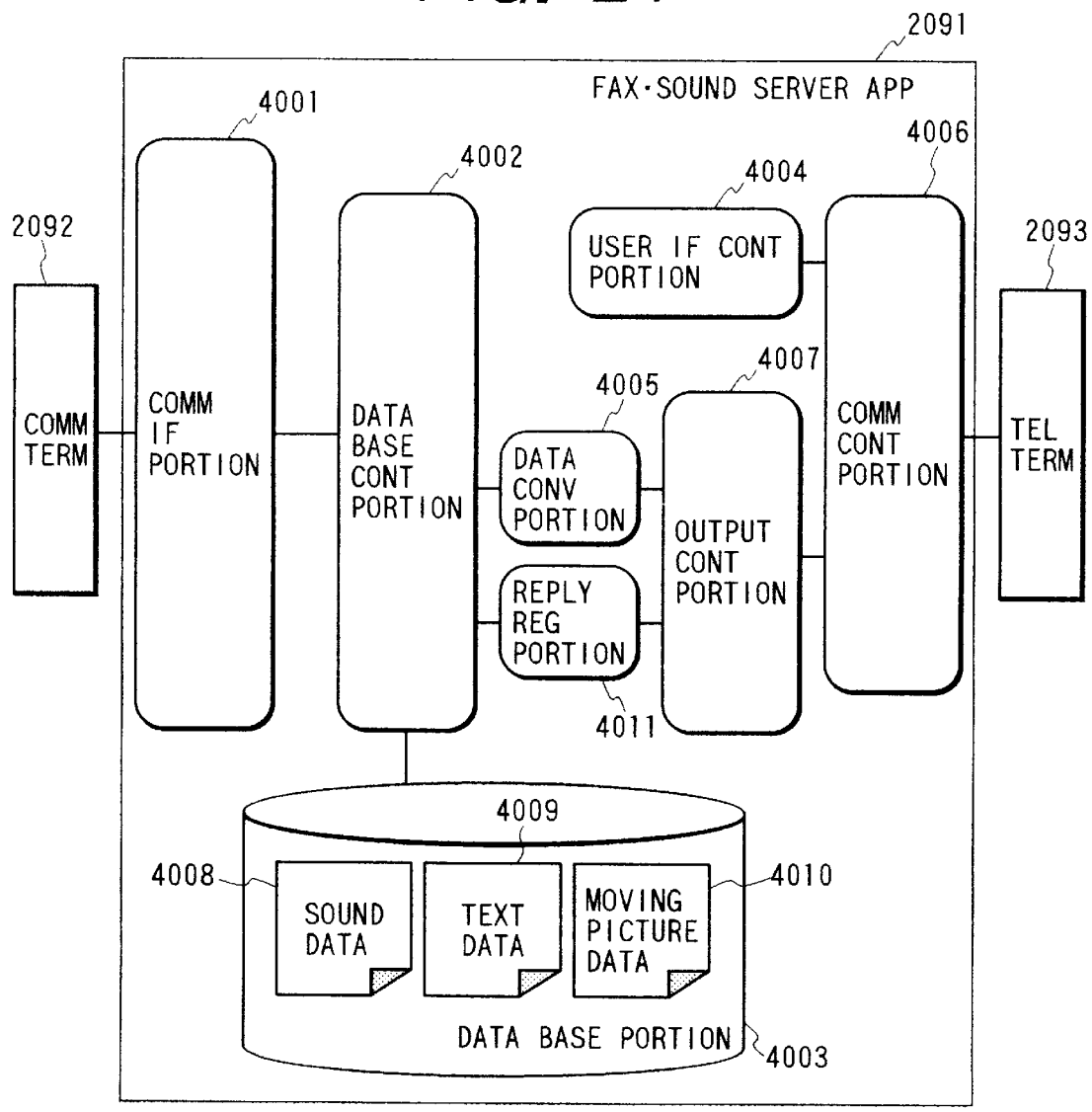
FIG. 24 is a block diagram of a facsimile and sound server apparatus of a nineteenth embodiment.

A nineteenth embodiment will be descried. FIG. 24 is a block diagram of a facsimile and sound server apparatus 2091 of the nineteenth embodiment.

The facsimile and sound server apparatus 2091 of the nineteenth embodiment comprises a computer interface portion 4001, a data base control portion 4002, a data base portion 4003, a user interface portion 4004, a data conversion portion 4005, a communication control portion 4006, and an output control portion 4007, and a replay registration portion 4011.

The data base portion 4002 stores sound data 4008, text data 4009, and moving picture data 4010.

An operation of the facsimile and sound server apparatus 2091 having the structure mentioned above will be described in the case that data is acquired from a telephone terminal 2093.

At first, a user calls the communication control portion 4006 from the telephone terminal 2093. The communication control portion 4006 makes a connection to the telephone terminal 2093. The user inputs and sends "data reading" in response to a sound guidance from the communication control portion 4006 using push buttons on the telephone terminal 2093.

The communication control portion 4006 requests the user to input its user ID and password with the sound guidance. The user interface control portion 4004 checks the user ID and the password as to whether the user is allowed to effect the function of "data reading".

If the user interface control portion 4004 permits the function of "data reading", the communication control portion 4006 requests the user to input its box number with the sound guidance.

The inputted box number is sent to the data base control portion 4002 and the data base control portion 4002 searches and reads the corresponding data from the data base portion 4003.

The sound data 4008, the text data 4010, and moving picture data 4010 are sent to the data conversion portion 4005 from the data base control portion 4002. The data conversion portion 4005 converts all read data into data of which type matches to the telephone terminal 2093 and transmits the converted data to the telephone terminal 2093 through the communication control portion 4006. On every completion of transmitting one set of data, a sound message requests the next operation. In response to this, the user commands an operation such as "reproducing the next data", "transmission of the same data", or "reproducing the top data" by depressing push buttons. The output control portion 4007 recognizes the command and executes the next processing.

If the user selects one of predetermined functions through the selection operation mentioned above, i.e., the user selects a function of "production of a replay", the output control portion 4007 recognizes this and provides a sound message "When you hear a tone, please provide a message through the handset. On completion of the message, depress the push button #" to the user. When the recording has been completed, the output control portion 4007 provides a sound message "a transmission processing is executed" to the user and the replay registration portion 4011 registers the sound message of reply in the data base portion 4003 as a reply directed to the sender of the read data.

Moreover, functions of transmitting and receiving the electronic mail may be added. In that case, the user can send the replay of the registered sound data to the sender of the read data as an electronic mail.

Moreover, the user can input the address data or dial the number of the sender using the push button of the telephone terminal 2093.

The facsimile server apparatus 2091 mentioned above provides intercommunication through the data base portion 4003 and data conversion portion 4005.

Therefore, the operations of the facsimile and sound server 2091 are selectively provided to the user of the telephone terminal 2093.

What is claimed is:

1. A facsimile and sound server apparatus comprising:

a line communication portion having a plurality of ports coupled to telephone terminals and facsimile terminals of users through a public communications line;

a communication control portion for controlling receipt of calls and transmission of sound responses, and for receiving and transmitting facsimile communication to respective of said plurality of ports;

a sound, image, and text data base for controlling sound data, image data, and text data to and from said telephone terminals, facsimile terminals and a personal computer, and for renewing and outputting data corresponding to a request for registration and a request for data reading from another portion;

a data conversion portion for converting between text data and sound data, and converting between said text data and image data in accordance with the terminals being serviced when data is inputted and outputted at said sound, image and text data base;

a graphic recognition portion for recognizing a figure in said image data from said facsimile terminal and for generating data in response thereto;

a facsimile data coloring portion for coloring recognized figures in accordance with a predetermined color arrangement palette;

a color image digitizing portion for converting color image into binary image data for said facsimile terminals;

a user control portion for registering said users, controlling passwords, and judging a request for validation of the user and a password; and a box control portion for controlling said sound, image and text data base and validating access for writing and reading said data base by said users.

2. A facsimile and sound server apparatus as claimed in claim 1, further comprising a remote server access portion for communicating with another facsimile and sound server apparatus and for registering data in said another facsimile and sound server apparatus and reading data from said another facsimile and sound server apparatus.

3. A facsimile and sound server apparatus as claimed in claim 2, further comprising an optical character reader for recognizing characters in said image data from said facsimile terminal and generating text data.

4. A facsimile and sound server apparatus comprising:

a line communication portion having a plurality of ports coupled to telephone terminals and facsimile terminals of users through a public communications line;

a communication control portion for controlling receipt of calls and transmission of sound responses, and for receiving and transmitting facsimile communication to respective of said plurality of ports;

a remote server access portion for communicating with another facsimile and sound server apparatus and for registering data in said another facsimile and sound server apparatus and reading data from said another facsimile and sound server apparatus;

a data renewing portion for periodically acquiring data absent in said facsimile and sound server apparatus from said another facsimile and sound server apparatus and registering said data in said facsimile and sound server apparatus;

a sound, image, and text data base for controlling sound data, image data, and text data to and from said telephone terminals, facsimile terminals and a personal computer, and for renewing and outputting data corresponding to a request for registration and a request for data reading from another portion;

a data conversion portion for converting between text data and sound data, and converting between said text data and image data in accordance with the terminals being serviced when data is inputted and outputted at said sound, image and text data base;

a user control portion for registering said users, controlling passwords, and judging a request for validation of the user and a password; and a box control portion for controlling said sound, image and text data base and validating access for writing and reading said data base by said users.

* * * * *